United States Patent
Luff

(10) Patent No.: US 10,707,760 B2
(45) Date of Patent: Jul. 7, 2020

(54) ASYNCHRONOUS CONTROLLER FOR LOW POWER HYSTERETIC BUCK-BOOST DC-DC CONTROLLER

(71) Applicant: RENESAS ELECTRONICS AMERICA INC., Milpitas, CA (US)

(72) Inventor: Gwilym Francis Luff, Great Shelford (GB)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/174,131

(22) Filed: Oct. 29, 2018

(65) Prior Publication Data

US 2019/0140542 A1 May 9, 2019

Related U.S. Application Data

(60) Provisional application No. 62/578,988, filed on Oct. 30, 2017.

(51) Int. Cl.
| | |
|---|---|
| *H02M 3/158* | (2006.01) |
| *H02M 3/157* | (2006.01) |
| *H02M 1/08* | (2006.01) |
| *H02M 1/00* | (2006.01) |

(52) U.S. Cl.
CPC .......... *H02M 3/1582* (2013.01); *H02M 1/08* (2013.01); *H02M 1/083* (2013.01); *H02M 3/157* (2013.01); *H02M 2001/0009* (2013.01)

(58) Field of Classification Search
CPC ..... H02M 3/1582; H02M 1/083; H02M 3/157
See application file for complete search history.

(56) References Cited

U.S. PATENT DOCUMENTS

| | | | |
|---|---|---|---|
| 7,116,568 B1 | 10/2006 | Birchenough | |
| 7,145,317 B1 | 12/2006 | Shah | |
| 7,330,019 B1* | 2/2008 | Bennett | H02M 3/156 323/282 |
| 8,406,014 B2 | 3/2013 | Liu et al. | |
| 8,415,933 B2 | 4/2013 | Loikkanen et al. | |
| 8,619,442 B2 | 12/2013 | Wrathall | |
| 8,786,270 B2* | 7/2014 | Wu | H02M 3/156 323/282 |
| 8,912,279 B2 | 12/2014 | Nakamura et al. | |
| 8,912,778 B1* | 12/2014 | Bennett | H02M 3/156 323/283 |
| 8,912,779 B2 | 12/2014 | Ren et al. | |
| 9,154,032 B1 | 10/2015 | Beijer | |
| 9,614,380 B2 | 4/2017 | Houston et al. | |
| 9,948,181 B2* | 4/2018 | Manohar | H02M 3/158 |
| 10,014,777 B1* | 7/2018 | Shumkov | H02M 3/1582 |
| 2005/0017703 A1 | 1/2005 | Walters et al. | |
| 2006/0284606 A1* | 12/2006 | Chen | H02M 1/44 323/259 |

(Continued)

*Primary Examiner* — Daniel Kessie
*Assistant Examiner* — Sisay G Tiku
(74) *Attorney, Agent, or Firm* — Foley & Lardner LLP

(57) ABSTRACT

The present embodiments relate generally to power controllers, and more particularly to synthetic current hysteretic control of a buck-boost DC-DC controller. In one or more embodiments, an asynchronous controller of a buck-boost converter implements a state diagram for controlling PFM-PWM and Buck-Boost transitions with minimal circuitry and power consumption.

9 Claims, 20 Drawing Sheets

(56) References Cited

U.S. PATENT DOCUMENTS

| | | | |
|---|---|---|---|
| 2009/0045786 A1* | 2/2009 | Krellner | H02M 3/1582 323/259 |
| 2010/0270995 A1 | 10/2010 | Laur et al. | |
| 2011/0241636 A1 | 10/2011 | Wu et al. | |
| 2012/0043818 A1* | 2/2012 | Stratakos | H02J 3/383 307/77 |
| 2012/0299553 A1 | 11/2012 | Menegoli et al. | |
| 2014/0225577 A1* | 8/2014 | Ivanov | H02M 3/1582 323/225 |
| 2015/0229215 A1* | 8/2015 | Choudhary | H02M 1/14 323/271 |
| 2015/0381044 A1* | 12/2015 | Bodano | H02M 3/1588 323/271 |
| 2016/0105110 A1 | 4/2016 | Houston et al. | |
| 2017/0040898 A1* | 2/2017 | Hong | H02M 3/1582 |
| 2017/0077817 A1* | 3/2017 | Houston | H02M 3/1582 |
| 2017/0207704 A1 | 7/2017 | Houston et al. | |
| 2017/0288550 A1* | 10/2017 | Park | H02M 1/14 |
| 2018/0166990 A1* | 6/2018 | Gibson | H02M 3/158 |

* cited by examiner

ASYNCHRONOUS CONTROLLER FOR LOW POWER HYSTERETIC BUCK-BOOST DC-DC CONTROLLER

CROSS-REFERENCE TO RELATED APPLICATIONS

The present application claims priority to U.S. Provisional Patent Appln. No. 62/578,988 filed Oct. 30, 2017, the contents of which are incorporated herein by reference in their entirety.

TECHNICAL FIELD

The present embodiments relate generally to power controllers, and more particularly to synthetic current hysteretic control of a buck-boost DC-DC controller.

BACKGROUND

Voltage regulators for certain applications such as IoT products, have very low power consumption requirements. Challenges can arise when such products can have a range of input power and output power differences, and so voltage regulators for such products must be able to provide buck, boost and buck-boost mode capabilities. Further challenges can arise when attempting to accommodate such ranges in a hysteretic controller, where a switching frequency needs to be internally adjusted without the use of external or other clock signals. Accordingly, there is a need for a solution to these challenges, among other things.

SUMMARY

The present embodiments relate generally to power controllers, and more particularly to synthetic current hysteretic control of a buck-boost DC-DC controller. In one or more embodiments, an asynchronous controller of a buck-boost converter implements a state diagram for controlling PFM-PWM and Buck-Boost transitions with minimal circuitry and power consumption.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
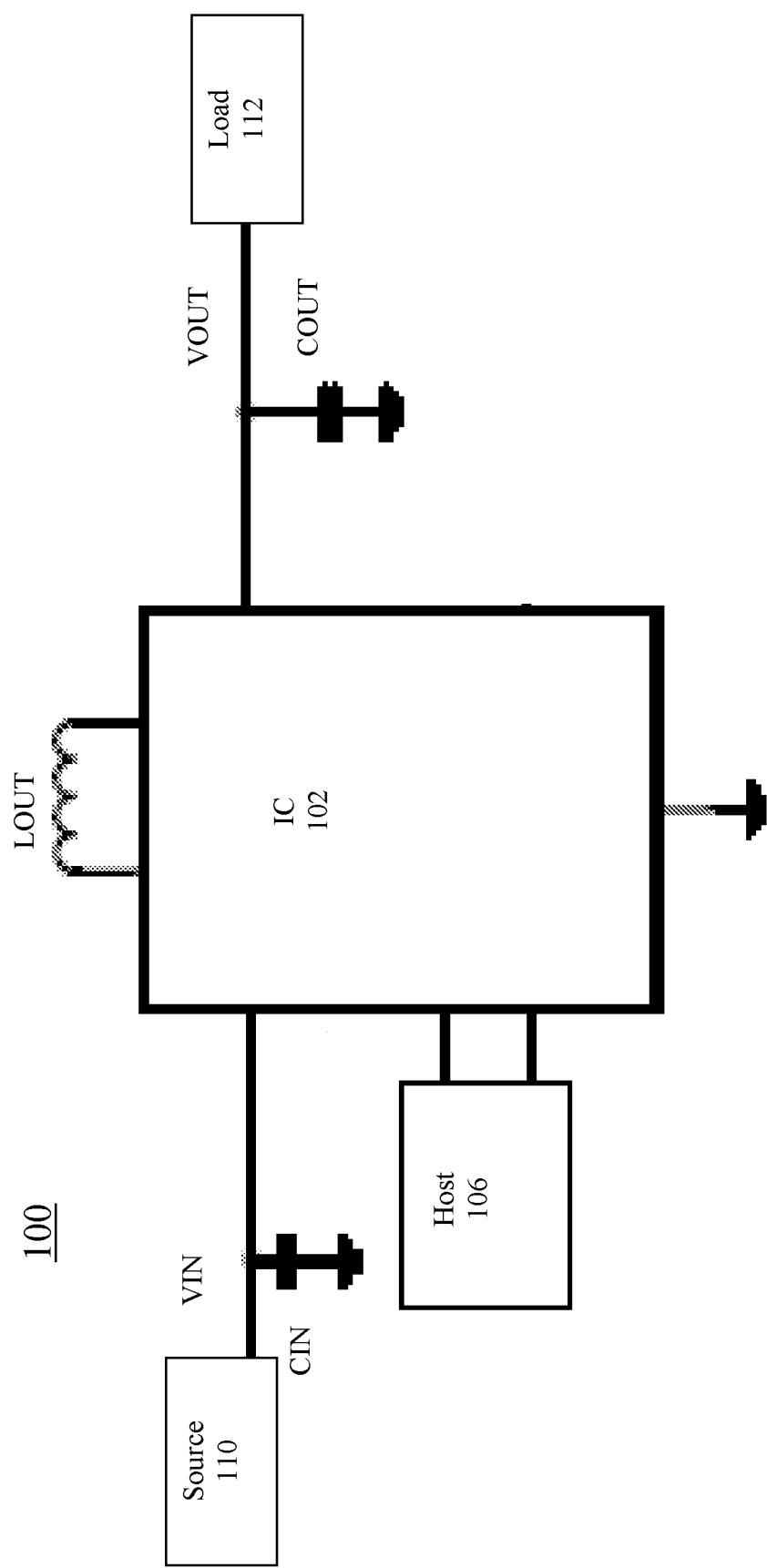
FIG. 1 illustrates an example buck-boost application for a fully hysteretic buck-boost controller according to embodiments.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present embodiments are directed to an integrated FET buck-boost DC-DC converter integrated circuit. For IoT and other low power applications it uses a minimal number of external components, in a straightforward application circuit. Integrated power FETs and voltage feedback divider are provided, along with digital control over an i2c bus. However, the principles of the embodiments could be applied to less integrated parts with off chip power devices, off chip feedback dividers and different control interfaces.

Among other things, the present applicant recognizes a need for synthetic current hysteretic control of a buck-boost DC-DC controller, including PFM-PWM and buck/boost transitions with minimal circuitry and low power consumption. For example, it would be desirable to avoid the extra power loss of conventional three-state buck-boost cycles, as are needed to give constant or controlled switching frequency and to allow voltage regulation when Vin is close to Vout. Also, there is a need to reduce the quiescent current of ripple generators to near zero between PFM current pulses. Current hysteretic modulator implementations require Gm amplifiers and voltage clamps to be active between PFM pulses to maintain voltage levels and provide an immediate start to voltage ramps. And further, there is no quiescent current budget for an error amplifier over and above that for a low Iq comparator. A separate error amplifier and ripple summing circuit would have to start from zero current and be active in 50 ns. Likewise, there is no current budget for a 'mid rail' voltage reference between PFM pulses.

To address these and other issues, the present embodiments provide a hysteretic controller window structure providing buck mode control, boost mode control, and buck to boost and boost to buck transitions from a single hysteretic variable. Only two comparators are required, similar to previous single mode hysteretic controllers. In these and other embodiments, variable frequency operation of the controller is provided, allowing buck operation when Vin is only slightly larger than Vout and boost operation when Vin is equal to or slightly less than Vout. This also removes the need for three-state buck-boost cycles. Some embodiments incorporate use of a single inductor damping switch both to implement a bypass mode and also to reduce EMI by damping out the inductor open circuit ringing during PFM. Some additional or alternative embodiments provide cycle by cycle switching from boost to buck mode, driven by window comparator outputs, This allows the controller to regulate the output voltage when Vin≈Vout by switching between buck and boost modes as required. It also adapts the buck to boost switch-over point to account for voltage drops in the inductor DC resistance and switch resistances. Other additional or alternative embodiments provide a passive synthetic current ripple generator applicable to buck-boost, boost and buck DC-DC converters. These and other embodiments use only R, C and switch elements to produce required waveforms in both PWM and PFM modes, with no start-up delays. Yet further additional or alternative embodiments provide a low power merged circuit implementing low Iq comparator, type one error amplifier, ripple summing and window generation functions in the current budget of a low Iq comparator. A fully differential structure is used to avoid the need for a 'mid-rail' reference.

FIG. 1 illustrates an example system incorporating a buck-boost controller according to embodiments.

As can be seen, system 100 includes a buck-boost DC-DC converter integrated circuit (IC) 102. For low-power applications it uses a minimal number of external components, such as input and output capacitors CIN and COUT, and output inductor LOUT. As will be shown in more detail below, power FETs and a voltage feedback divider can be integrated within IC 102, along with digital control from a host 106 (e.g. a CPU, power management IC, etc.) over an I2C bus, for example. According to certain general aspects, IC 102 is able to provide a regulated voltage to a load 112 (e.g., having an output voltage VOUT from 1.6V to 6.375V) from a power source 110 (e.g., having an input voltage VIN from 0.8V to 5.5V).

Load 112 can be an IoT device such as a smart speaker, etc., or any other type of device having low power consumption requirements or where low power consumption would be desirable. Source 110 can be a battery, a power adapter, a USB connector, etc.

Figure 2:
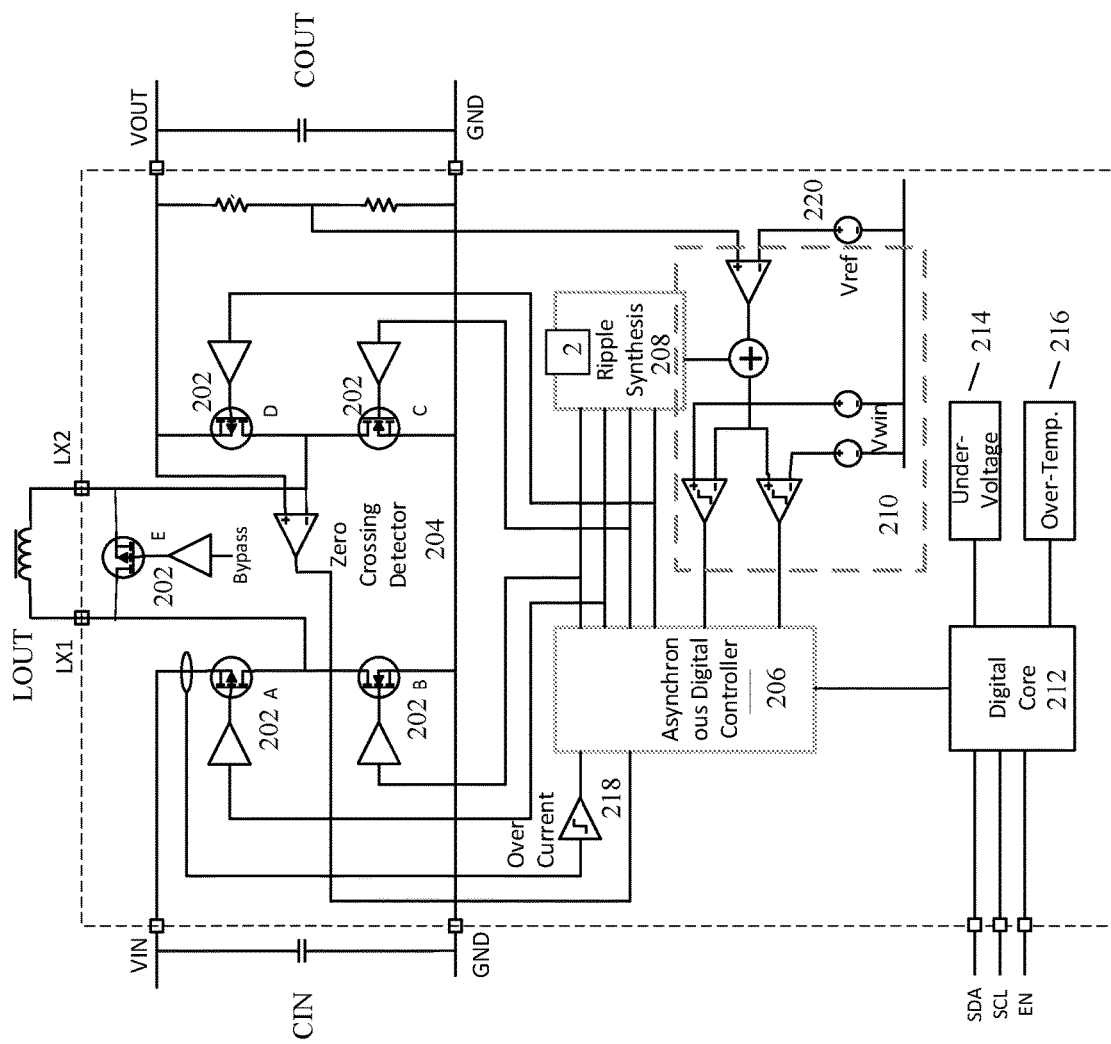
FIG. 2 is an example chip block diagram according to embodiments.

FIG. 2 is an internal block diagram of an example IC 102 according to the present embodiments.

As shown, it includes two integrated power stages comprised of FETs 202-A to 202-B. FET 202-A is the buck top switch, FET 202-B is the buck bottom switch, FET 202-C is the boost bottom switch and FET 202-D is the boost top switch. FET 202-E is a bypass switch, as will be explained in more detail below.

The major components to be described in this disclosure include asynchronous digital controller 206, ripple synthesis circuit 208 and hysteretic controller analog part 210. The combination of these components forms a controller circuit for a buck-boost DC-DC converter. However, it should be noted that other embodiments of a hysteretic buck-boost DC-DC converter may be comprised of only one or more of asynchronous digital controller 206, ripple synthesis circuit 208 and hysteretic controller analog part 210. Returning to the example of FIG. 2, the chip is completed by an inductor current zero crossing detector 218, low power voltage reference circuit (shown simply as 'Vref' 220), protection circuitry 214, 216 and a digital control core 212.

Figure 3:
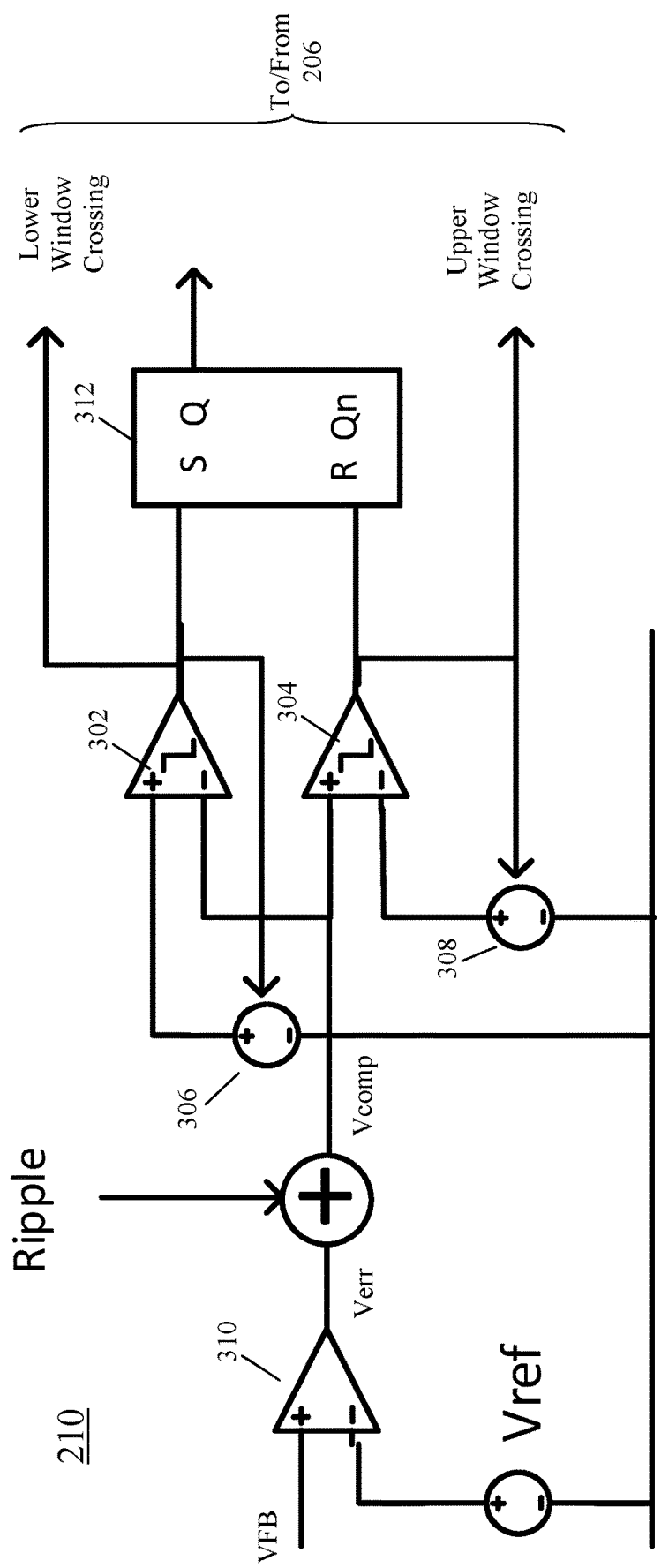
FIG. 3 is an example block diagram of a 3-window comparator structure according to embodiments.

FIG. 3 is a schematic diagram of an example hysteretic controller analog part 210 according to embodiments.

The principal inputs to this block are a divided down version of the output voltage VFB, a reference voltage (Vref) and a signal representing the instantaneous inductor current (Ripple). Error amplifier 310 takes the difference between the reference and feedback voltages, and amplifies them, producing a voltage error signal Verr. This is then added to the inductor current signal (Ripple) to produce a composite hysteretic variable Vcomp. Using a composite signal is what makes the controller according to embodiments a hysteretic boost controller. It also gives the controller similar dynamics to a current mode controller.

The composite hysteretic variable Vcomp is fed into a 3-level window comparator 320. The 3-level window comparator can comprise three individual comparators, or as shown in this example, it can be made of two standard comparators 302, 304 and switched voltage references 306, 308. The switching of the voltage references (e.g., in accordance with or to enable mode transitions, as will become more apparent below) generates three voltage thresholds (or 'window boundaries'), of which only one or two are needed at any one point in time. Accordingly, although only one voltage reference is shown for each of references 306, 308, both can actually be implemented by two different voltage reference generators providing two different window voltages, only one of which is switched into the circuit at a time.

As will become more apparent below, when the composite hysteretic variable Vcomp falls below a lower voltage threshold set by voltage reference 306, comparator 302 outputs a logic "high" signal, which sets the flip-flop 312 and causes its Q output to go to logic high (and the Qn output to go to logic low). The logic "high" signal from comparator 302 is also provided to digital controller 206. Similarly, when the composite hysteretic variable Vcomp rises above a higher voltage threshold set by voltage reference 308, comparator 304 outputs a logic "high" signal, which resets the flip-flop 312 and causes its Q output to go to logic "low." (and the Qn output to go to logic "high"). The logic "high" signal from comparator 304 is also provided to digital controller 206.

Figure 4:
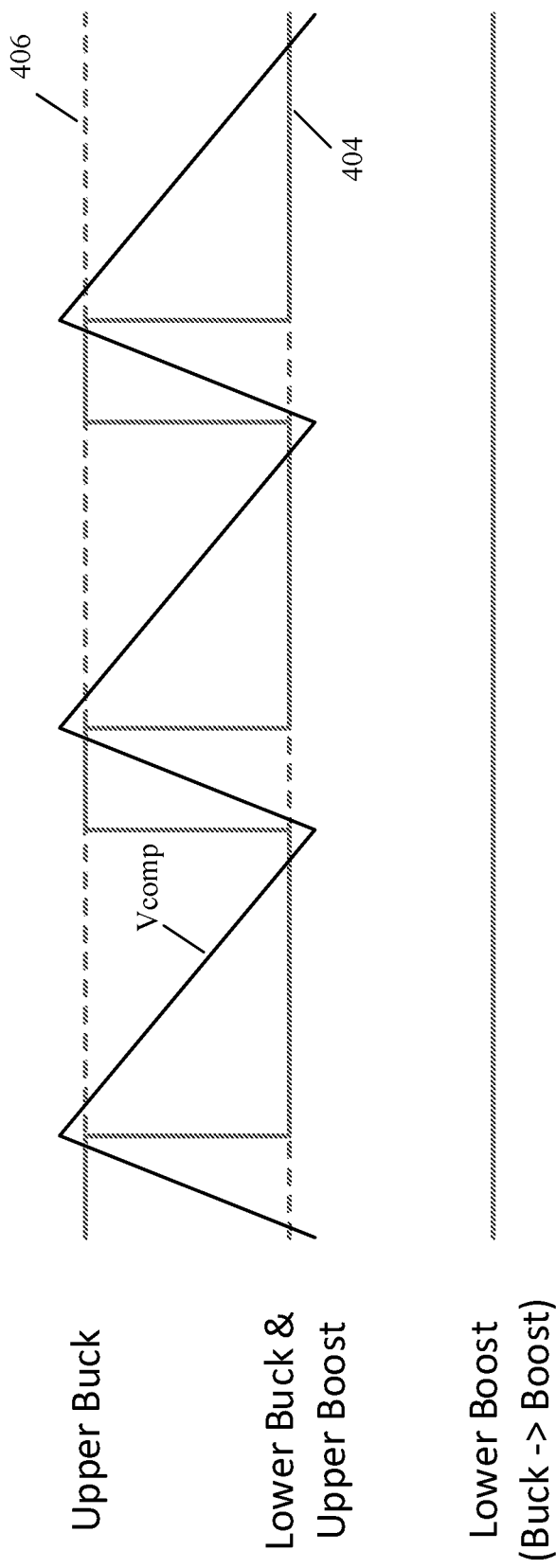
FIG. 4 is a window diagram illustrating an example buck mode operation according to embodiments.

FIG. 4 is a timing diagram for further illustrating an example buck mode operation of part 210 according to embodiments.

When generating buck switching cycles, the hysteretic variable Vcomp ramps back and forth between a middle window level 404 and an upper, buck window level 406 as shown in FIG. 4. The rising edges of the Vcomp waveform shown in FIG. 4 correspond to the first part of a buck PWM cycle (indicated by the Q signal output from flip-flop 312 being a logic "high" as shown in FIG. 4) where the inductor current is rising because the inductor is connected between the input voltage (VIN) and output voltage (VOUT). When the hysteretic variable Vcomp reaches the upper window 406, the upper comparator 304 trips, and Vcomp starts the downward ramp. This hysteretic variable is the sum of a voltage error and current ripple. So if the output voltage is too high, the ripple sum will rise, causing the window comparator 304 to trip at a lower inductor current. Likewise, if the output voltage is too low, the ripple sum will have to rise to a higher value to trip the comparator 304. So a low output voltage will produce higher inductor current, and a high output voltage a lower inductor current. This leads to current mode operation, where the inductor current is proportional to the voltage error.

The falling edges of the Vcomp waveform correspond to the second part of the PWM cycle (indicated by the logic "low" level of the Q signal output by flip-flop 312 as shown in FIG. 4), where the inductor current is falling, because the inductor is connected between the output voltage (Vout) and ground. When the hysteretic variable Vcomp reaches the lower middle window 404, the lower comparator 302 trips, and Vcomp starts the upward ramp. The middle window trip point is also acting on a sum of a voltage error and current ripple, so again high output voltage will lead to a lower inductor current, and a high output voltage will lead to a low output current.

This reveals several desirable properties of hysteretic controller 102 according to the present embodiments: (1) Current mode control dynamics, as the hysteretic variable is the sum of a current and voltage component; (2) Self-oscillating operation, where the controller generates its own switching frequency. Not only does it not require a clock source, but the design difficulties of a clocked PWM system are avoided; (3) No sub-harmonic instability. In a clocked current mode converter, this is caused by the interaction of a potential hysteretic oscillation and a fixed clock frequency, leading to a chaotic instability. As a result, no fixed (compensation) ramp is needed, which both simplifies the modulator and increases its gain; (4) Dual edge peak/valley control. This gives lower delay through the modulator, improving phase margin and transient response.

Figure 5:
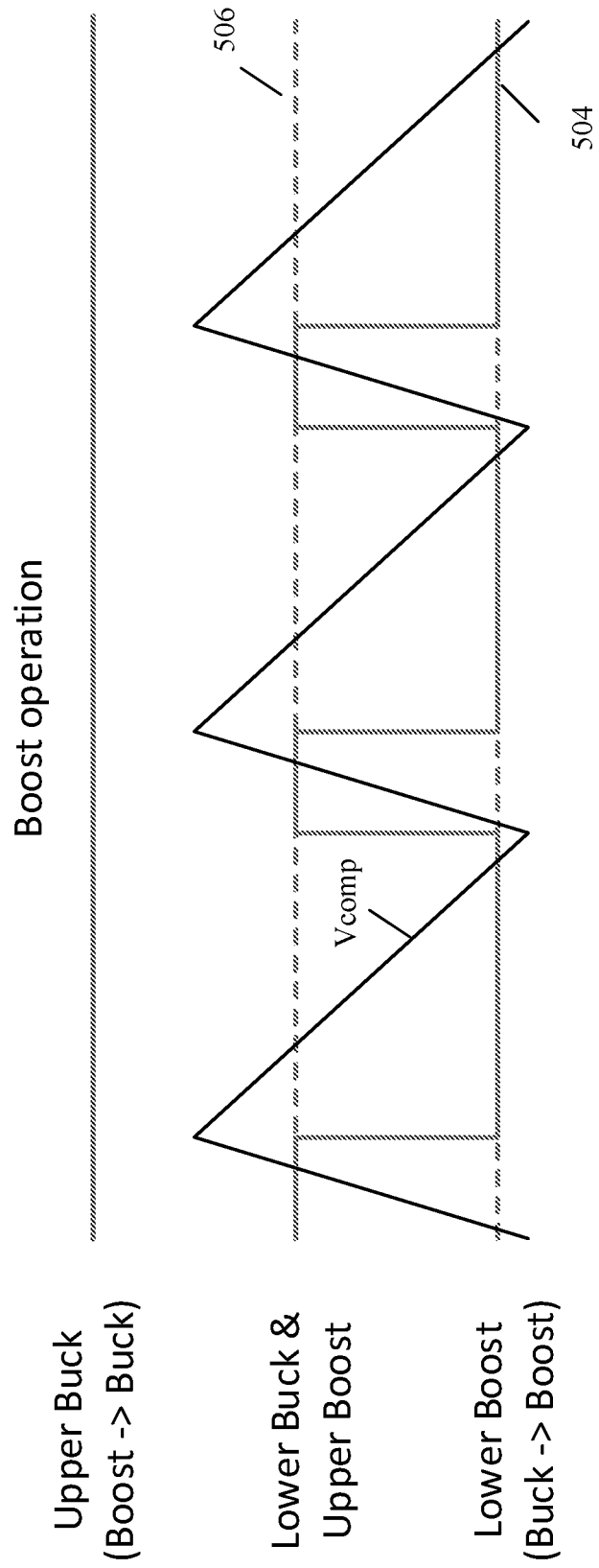
FIG. 5 is a window diagram illustrating an example boost mode operation according to embodiments.

Advantageously, the same example circuitry 210 shown in FIG. 3 can also produce boost mode cycles, when the hysteretic variable Vcomp ramps back and forth between a lower, boost window and the middle window level, as shown in the timing diagram of FIG. 5.

The rising edges of the Vcomp waveform shown in FIG. 5 correspond to the first part of a boost PWM cycle (as indicated by the logic "high" level of the Q signal output by flip-flop 312 as shown in FIG. 5), where the inductor current is rising because the inductor is connected between the input voltage (VIN) and ground. When the hysteretic variable Vcomp reaches the middle window 506, the upper comparator 304 trips and Vcomp starts the downward ramp. The hysteretic variable Vcomp is the sum of a voltage error and current ripple. So if the output voltage is too high, the ripple sum will rise, causing the window comparator 304 to trip at a lower inductor current. Likewise, if the output voltage is too low, the ripple sum will have to rise to a higher value to trip the comparator 304. So a higher output voltage leads to a lower inductor current, and vice-versa.

The falling edges of the Vcomp waveform correspond to the second part of the cycle (as indicated by the Q signal output from flip-flop 312 being a logic "low" as shown in FIG. 5), where the inductor current is falling, because the inductor is connected between the output voltage (VOUT) and the input voltage (VIN). When the hysteretic variable Vcomp reaches the lower window 504, the lower comparator 302 trips and Vcomp starts the upward ramp. The lower (boost) window 504 trip point is also acting on a sum of a voltage error and current ripple, so again high output voltage will lead to a lower inductor current, and a high output voltage will lead to a low output current. This gives the hysteretic boost controller according to the embodiments the same advantages as the hysteretic buck controller.

The 3-window structure of the example circuit 210 shown in FIG. 3 also enables two important controller features: buck/boost transitions and auto-bypass operation. First, example aspects of buck-boost and boost-buck transitions according to embodiments will be described with reference to FIGS. 6 and 7.

Figure 6:
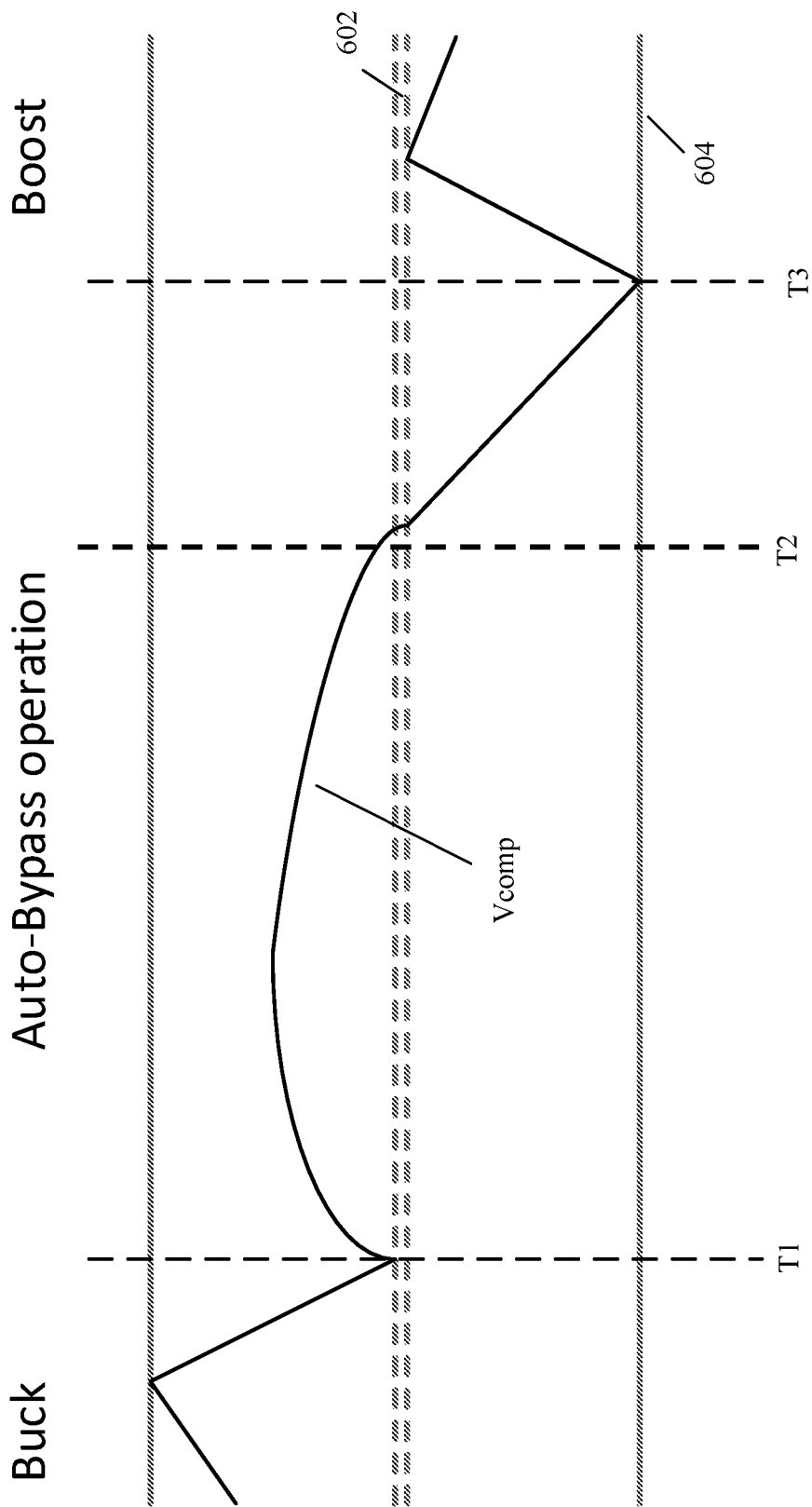
FIG. 6 is a window diagram illustrating example aspects of buck to boost transitions according to embodiments.

First, as shown in FIG. 6, suppose that the DC-DC converter is operating in the buck mode at time T1, but thereafter the input voltage begins steadily falling. Once the output voltage is equal to or lower than the input voltage, the inductor current can no longer rise in the 'Buck On' state, and will start to fall instead. Both the inductor current signal and the voltage error signal start to change in the same direction, and the hysteretic variable Vcomp returns to the middle window voltage 602. The converter, operating in buck mode, cannot respond to this level crossing at time T2, so the hysteretic variable Vcomp falls further, until it reaches the lower (boost) window level 604. Now the DC-DC converter can take action. It transitions to boost mode and starts a boost cycle at T3, which will ramp up the inductor current quickly. When the inductor is connected back to the output, it will raise the output voltage above the input voltage and restore regulation.

Figure 7:
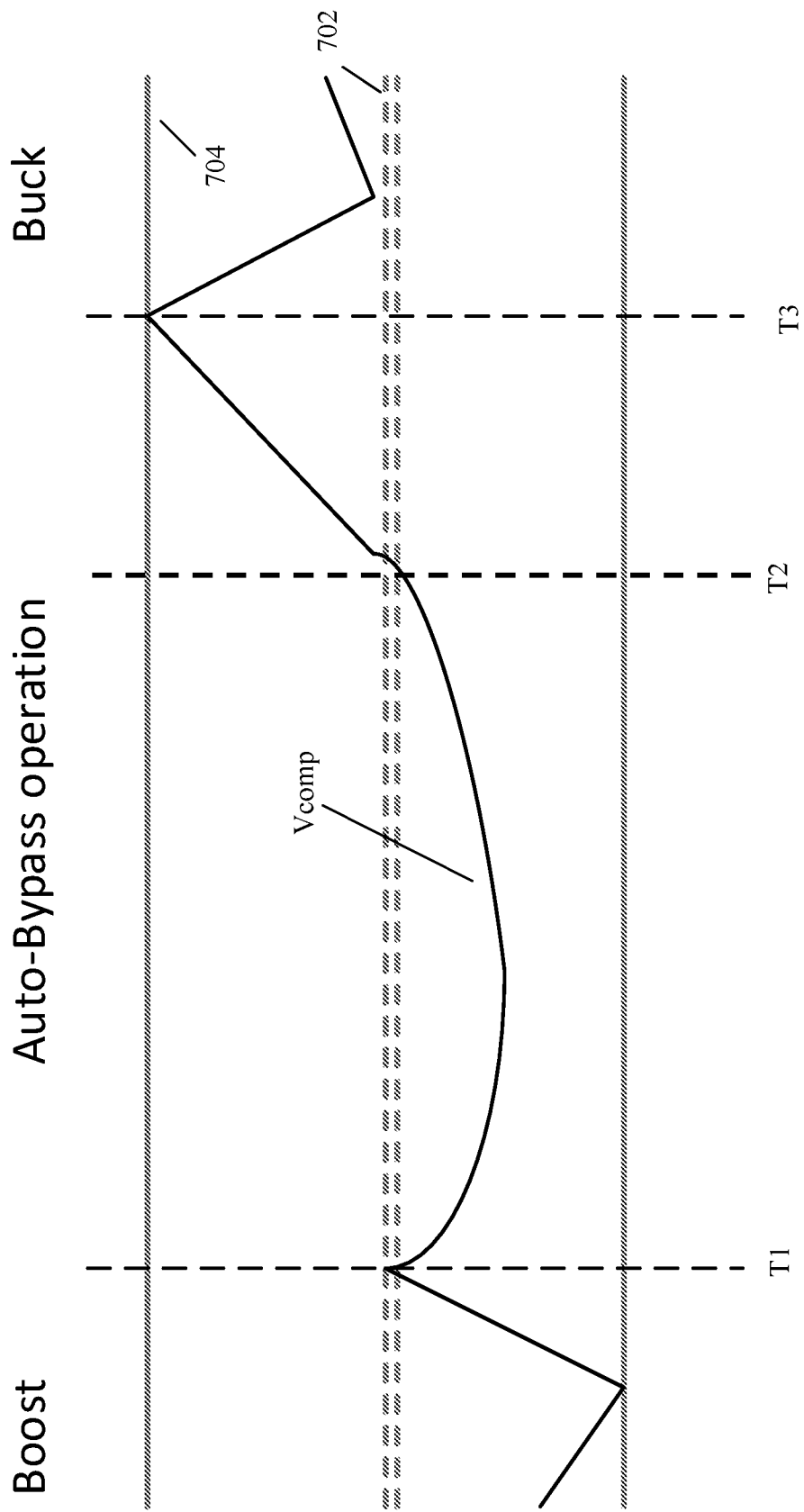
FIG. 7 is a window diagram illustrating example aspects of boost to buck transitions according to embodiments.

As shown in FIG. 7, a similar process ensues if the DC-DC converter is operating in the boost mode at time T1, but with the input voltage thereafter steadily rising. Once the input voltage is equal to or greater than the input voltage, the inductor current can no longer fall during 'Boost Off' state, and the current will rise instead. Both the inductor current signal and the voltage error signal start to change in the same direction, and the hysteretic variable Vcomp returns to the middle window 702. The converter cannot respond to this transition during boost mode, so the hysteretic variable Vcomp rises further, until it reaches the upper (buck) window level 704. Now the DC-DC converter can take action. It transitions to buck mode and starts a buck off cycle at time T3, which will cause the inductor current to ramp down quickly, and stop the output voltage rising further.

Figure 8:
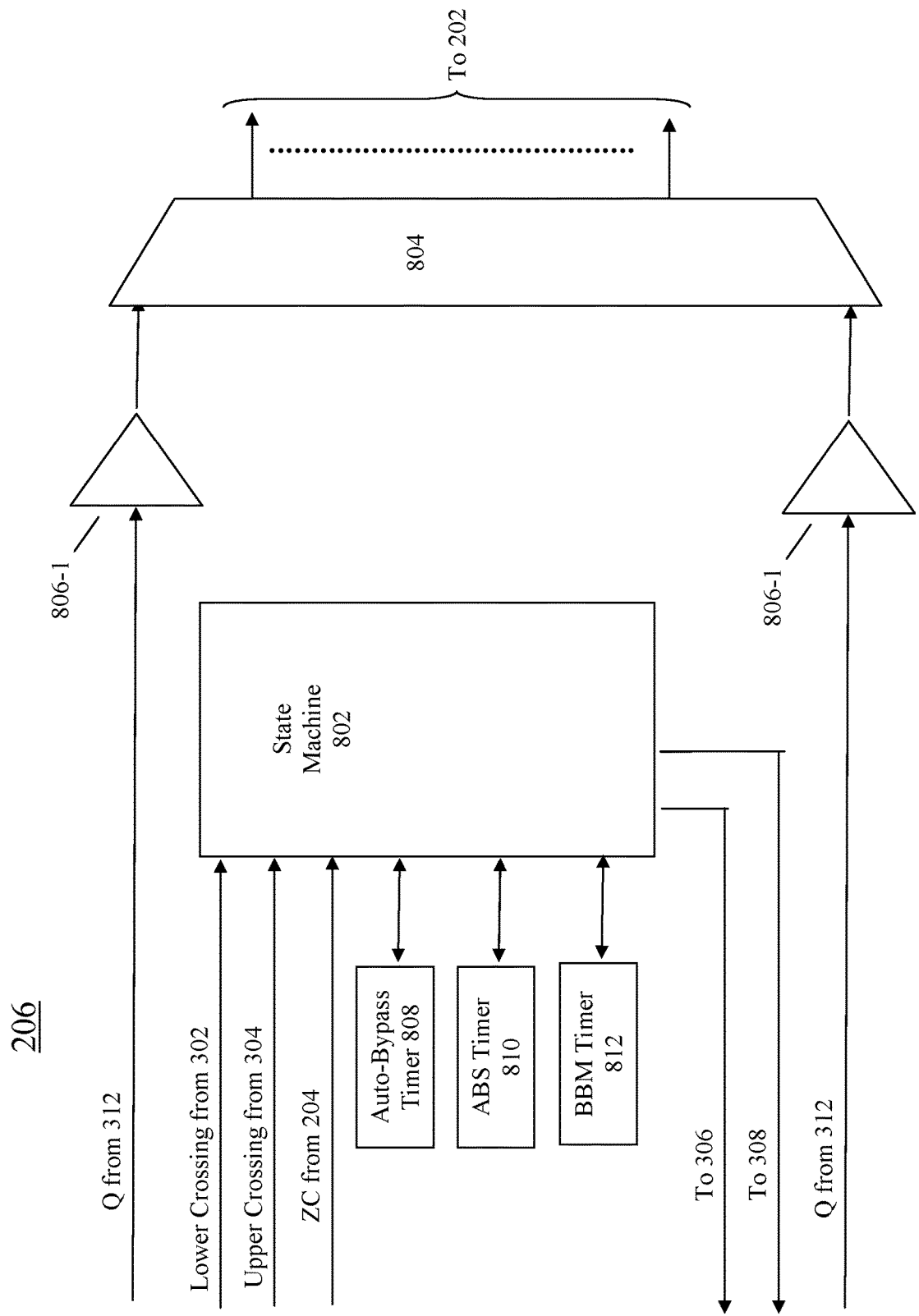
FIG. 8 is a block diagram illustrating an example digital controller implementing a state diagram for controlling buck and boost mode operations according to embodiments.

FIG. 8 is a block diagram of an example digital controller 206 that can operate with part 210 to implement the buck and boost operations shown in FIGS. 4 and 5, as well as the buck/boost transitions and auto-bypass operations illustrated in FIGS. 6 and 7.

As shown in this example, controller 206 receives the Lower Crossing signal from window comparator 302 and the Upper Crossing signal from window comparator 304, as well as the Q and Qn signals from flip-flop 312. The Lower and Upper window crossing signals are provided to a state machine 802 which controls a multiplexer 804. The Q and Qn signals are provided to PWM drivers 806-1 and 806-2. The multiplexer 804 determines which of switches 202 receive drive signals from drivers 806-1 and 806-2.

Based on the signals received from part 210 as shown in FIG. 8, state machine 902 controls buck and boost operation (by controlling the PWM drive signals output via multiplexer 504 to operate switches 202) generally as shown in TABLE 1:

TABLE 1

| | |
|---|---|
| Buck On: | Switches 202-A and 202-D both closed |
| Buck Off: | Switches 202-B and 202-D both closed |
| Boost On: | Switches 202-A and 202-C both closed |
| Boost Off: | Switches 202-A and 202-D both closed |

Moreover, state machine 802 further controls buck and boost operations as described in connection with FIGS. 4 and 5, as well as buck/boost transitions as described in connection with FIGS. 6 and 7, in accordance with the state diagram of FIG. 9.

As can be seen, state machine 802 implements a buck mode 902 and a boost mode 904, which both respectively include the "Off" and "On" states shown in TABLE 1. Starting from the example where controller is in a "Buck Off" state in buck mode 902, state machine 802 causes the controller to stay in that state until it receives a Lower window crossing signal from comparator 302 of part 210. Upon receipt of this signal, it causes the controller to transition to the "Buck On" state (e.g., by causing multiplexer 804 to drive switches 202 as shown in TABLE 1). State machine 802 then causes the controller to stay in the "Buck On" state until it receives either an Upper window crossing signal from comparator 304 of part 210 or a Lower window crossing signal from comparator 304 of part 210. If it receives the Upper window crossing signal from comparator 304 of part 210, state machine 802 causes the controller to transition to the "Buck Off" state (e.g., by causing multiplexer 804 to drive switches 202 as shown in TABLE 1). Otherwise, if it receives the Lower window crossing signal from comparator 302 of part 210, state machine causes the controller to transition to Boost Mode 904 and a "Boost On" state (e.g., by causing multiplexer 804 to drive switches 202 as shown in TABLE 1).

Figure 9:
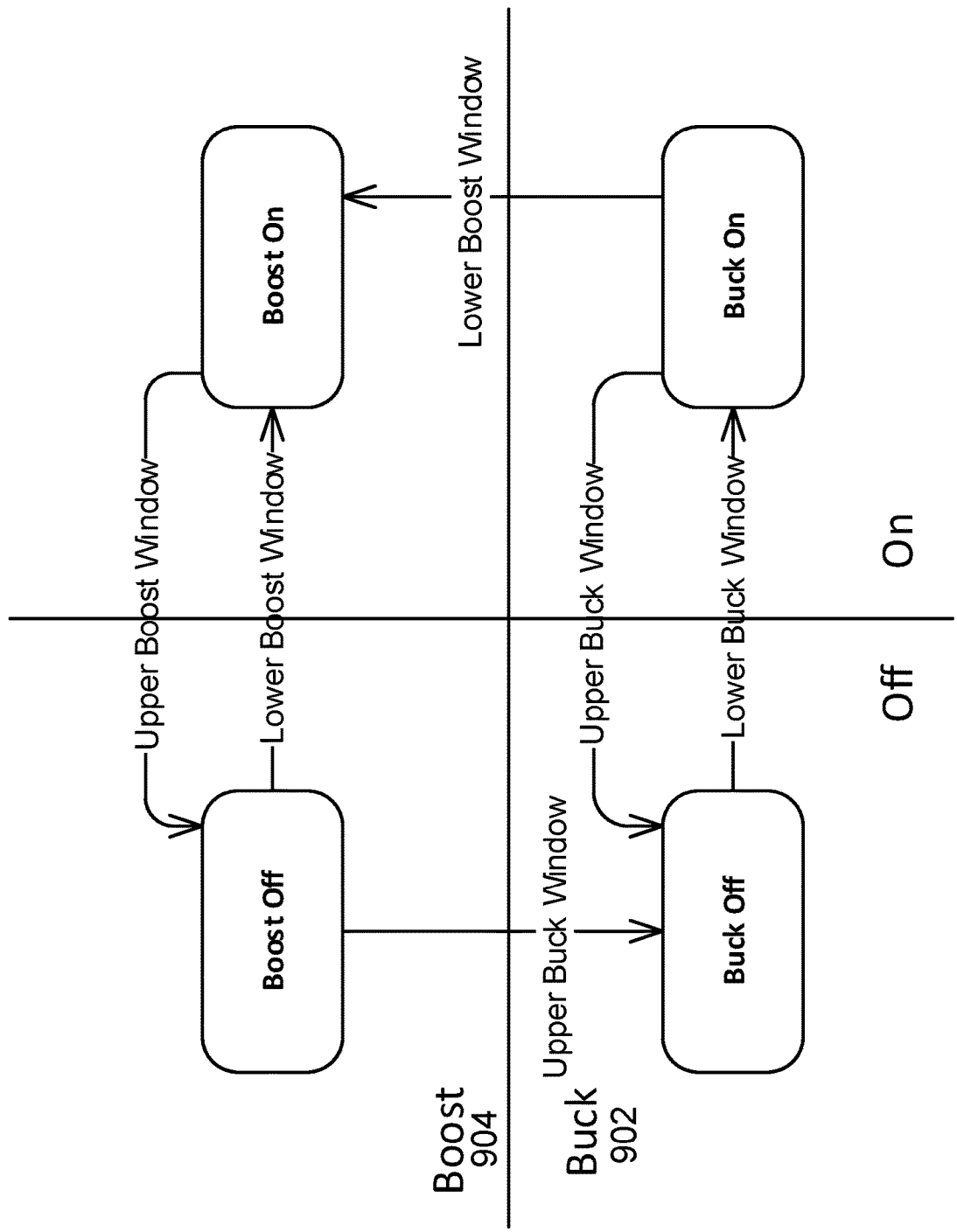
FIG. 9 is a first example state diagram of a hysteretic buck-boost controller according to embodiments.

As further shown in FIG. 9, when the controller is in the "Boost On" state of boost mode 904, state machine 802 causes the controller to stay in the "Boost On" state until it receives an Upper window crossing signal from comparator 304 of part 210. Upon receipt of the Upper window crossing signal from comparator 304 of part 210, state machine 802 causes the controller to transition to the "Boost Off" state (e.g., by causing multiplexer 804 to drive switches 202 as shown in TABLE 1). State machine 802 then causes the controller to stay in the "Boost Off" state until it receives either a Lower window crossing signal from comparator 302 of part 210 or an Upper window crossing signal from comparator 304 of part 210. If it receives the Lower window crossing signal from comparator 302 of part 210, state machine 802 causes the controller to transition to the "Boost On" state (e.g., by causing multiplexer 804 to drive switches 202 as shown in TABLE 1). Otherwise, if it receives the Upper window crossing signal from comparator 304 of part 210, state machine causes the controller to transition to a "Buck Off" state (e.g., by causing multiplexer 804 to drive switches 202 as shown in TABLE 1).

As further shown in FIG. 8, state machine 802 further sends switching signals to window generators 306 and 308 to enable transitions between, and operations for, buck and boost mode. As described above, this can include causing both of the generators 306 and 308 to switch between two different voltage references.

In embodiments, state machine 802 can also implement a PFM regulation mode. For example, as further shown in FIGS. 2 and 8, a zero inductor current signal ZC can be detected by a zero crossing detector 204 across switch 202-D, and the state machine 802 can cause the controller tri-state the appropriate output stage. Tri-stating the last switched power stage reduces the amount of switching activity in normal PFM scenarios. This adds 'Tri-state' states into the state diagram.

Figure 10:
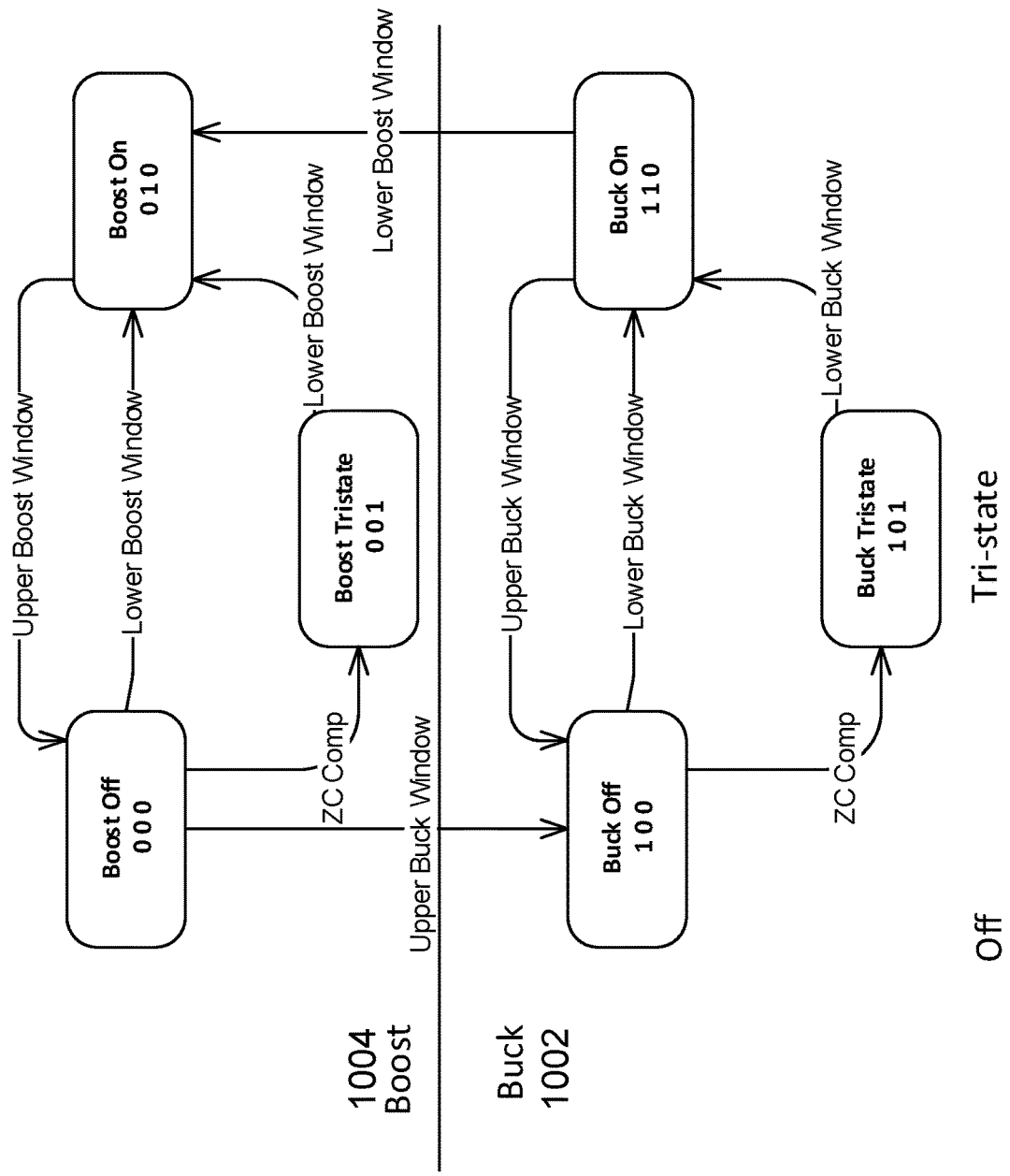
FIG. 10 is another example state diagram of a hysteretic buck-boost controller with PFM mode according to embodiments.

More particularly, FIG. 10 is an example state diagram that state machine 802 can follow to implement a hysteretic buck-boost controller with PFM regulation mode according to embodiments.

The example of FIG. 10 includes a buck mode 1002 of operation and a boost mode 1004 of operation, which can be implemented similarly to buck mode 902 and boost mode 904 as described above in connection with the state diagram of FIG. 9. However, as shown in FIG. 10, buck mode 1002 differs from buck mode 902 by further including a "Buck Tristate" state and boost mode 1004 differs from boost mode 904 by further including a "Boost Tristate" state.

In this example, based on the signals received from part 210 as shown in FIG. 8, as well as the ZC signal from detector 204, state machine 902 controls buck and boost mode operation (by controlling the PWM drive signals output via multiplexer 504 to operate switches 202) generally as shown in TABLE 2:

TABLE 2

| | |
|---|---|
| Buck On: | Switches 202-A and 202-D both closed |
| Buck Off: | Switches 202-B and 202-D both closed |
| Buck Tristate: | Switch 202-D only closed |
| Boost On: | Switches 202-A and 202-C both closed |
| Boost Off: | Switches 202-A and 202-D both closed |
| Boost Tristate: | Switch 202-A only closed |

Accordingly, as shown in FIG. 10, in an example when the controller is in a buck mode 1002 of operation and in a "Buck Off" state, state machine 802 can cause a transition to a "Buck On" state similarly as described above in connection with buck mode 902. However, during a "Buck Off" state in buck mode 1002, upon receipt of a ZC signal from detector 204, state machine 802 can instead cause the controller to transition to a "Buck Tristate" state (e.g., by causing multiplexer 804 to drive switches 202 as shown in TABLE 2). State machine 802 can then cause the controller to remain in the "Buck Tristate" state until the lower crossing signal from comparator 302 in part 210 is received. Upon receipt of this signal, state machine 802 can cause a transition to the "Buck On" state similarly as described above in connection with buck mode 902.

Likewise, in an example when the controller is in a boost mode 1004 of operation and in a "Boost Off" state in boost mode 1004, state machine 802 can cause a transition to a "Boost On" state similarly as described above in connection with buck mode 904. However, during a "Boost Off" state, upon receipt of a ZC signal from detector 204, state machine 802 can instead cause the controller to transition to a "Boost Tristate" state (e.g., by causing multiplexer 804 to drive switches 202 as shown in TABLE 2). State machine 802 can then cause the controller to remain in the "Boost Tristate" state until the lower crossing signal from comparator 302 in part 210 is received. Upon receipt of this signal, state machine 802 can cause a transition to the "Boost On" state similarly as described above in connection with boost mode 904.

The bit pattern shown on each state in FIG. 10 is the binary state encoding used in the controller, in the order Buck, On, Tri-state, as follows:

| Buck | On | Tri-state |
|---|---|---|
| Controller is in Buck mode | Rising inductor current | Inductor is open circuit |

In embodiments, state machine 802 can further implement an auto-bypass operation. For example, an auto-bypass operation can occur if the input voltage is just sufficiently greater than the output voltage to sustain the IR drop across the inductor LOUT resistance and the switch 202 resistances. The converter will then stay in a state with both top switches (202-A and 202-D) closed. It will stay in this state until the combined voltage and current conditions cause one of the buck or boost thresholds to be crossed.

As shown in the example of FIG. 8, the auto-bypass function can be implemented by a timer 808. When controller is in either the "Buck On" or "Boost Off" states, state machine 802 starts the timer 808. If this timer 808 exceeds the auto-bypass timeout (e.g., 3 microseconds) without a transition out of the "Buck On" or "Boost Off" state, state machine 802 causes a transition to a "Bypass" state by causing the bypass switch 202-E to be closed (in addition to switches 202-A and 202-D). Bypass switch 202-E has a higher resistance than the inductor LOUT, so it does not conduct much DC current. Its function is to damp the LC circuit formed by the inductor LOUT, input capacitance CIN and output capacitance COUT. Without this the LC circuit will 'ring' in response to any disturbance, and the converter will expend switching cycles to control the ringing.

In this example, based on the signals received from part 210 as shown in FIG. 8, as well as the ZC signal from detector 204 and the auto-bypass timer 808, state machine 802 controls buck and boost mode operation (by controlling the PWM drive signals output via multiplexer 504 to operate switches 202) generally as shown in TABLE 3:

TABLE 3

| | |
|---|---|
| Buck On: | Switches 202-A and 202-D both closed |
| Buck Off: | Switches 202-B and 202-D both closed |
| Buck Tristate: | Switch 202-D only closed |
| Boost On: | Switches 202-A and 202-C both closed |
| Boost Off: | Switches 202-A and 202-D both closed |
| Boost Tristate: | Switch 202-A only closed |
| Bypass: | Switches 202-A, 202-D and 202-E closed |

Figure 11:
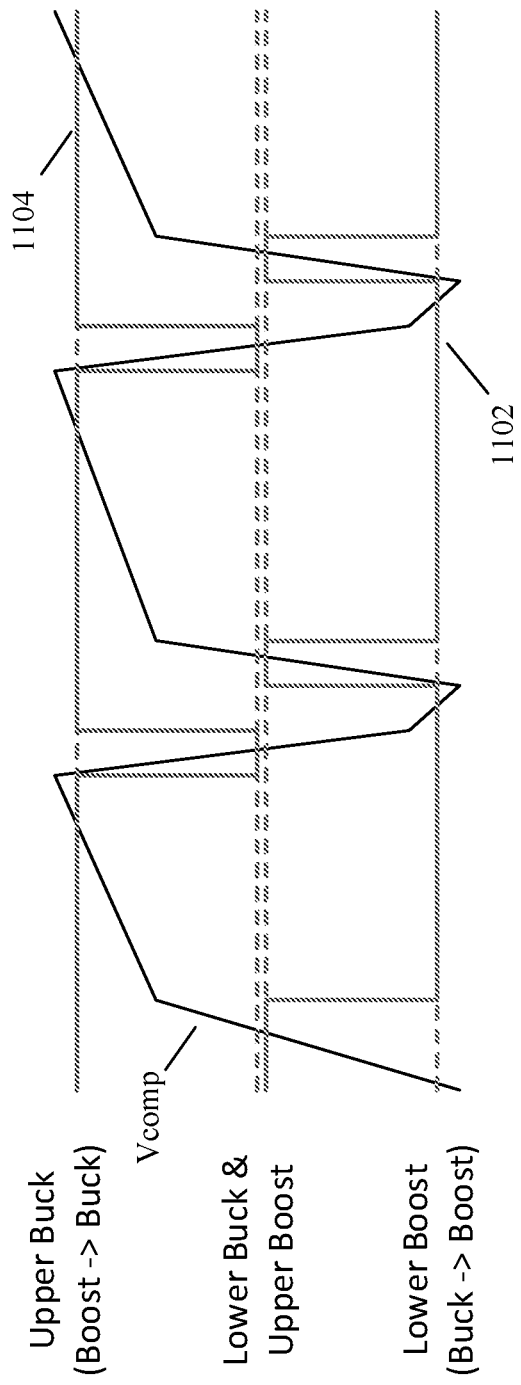
FIG. 11 is a timing diagram illustrating four-state buck-boost waveforms without an auto-bypass operation according to embodiments.

FIG. 11 illustrates example buck-boost waveforms without an auto-bypass operation according to embodiments. As can be seen, when the input voltage and output voltages are close to each other, Vcomp will have a tendency to "bounce" up and down between the extremes of the lower boost window voltage 1102 and the upper boost window voltage 1104. This has several disadvantages: (1) It has high output ripple, as the inductor current alternates between high and low current 'plateaus'; (2) It has higher losses, from both added switching and $I^2R$ losses from the current ripple. (3) The switching frequency is badly defined, as it is depends on the duration of the low slope 'plateaus' of the hysteretic variable Vcomp.

Figure 12:
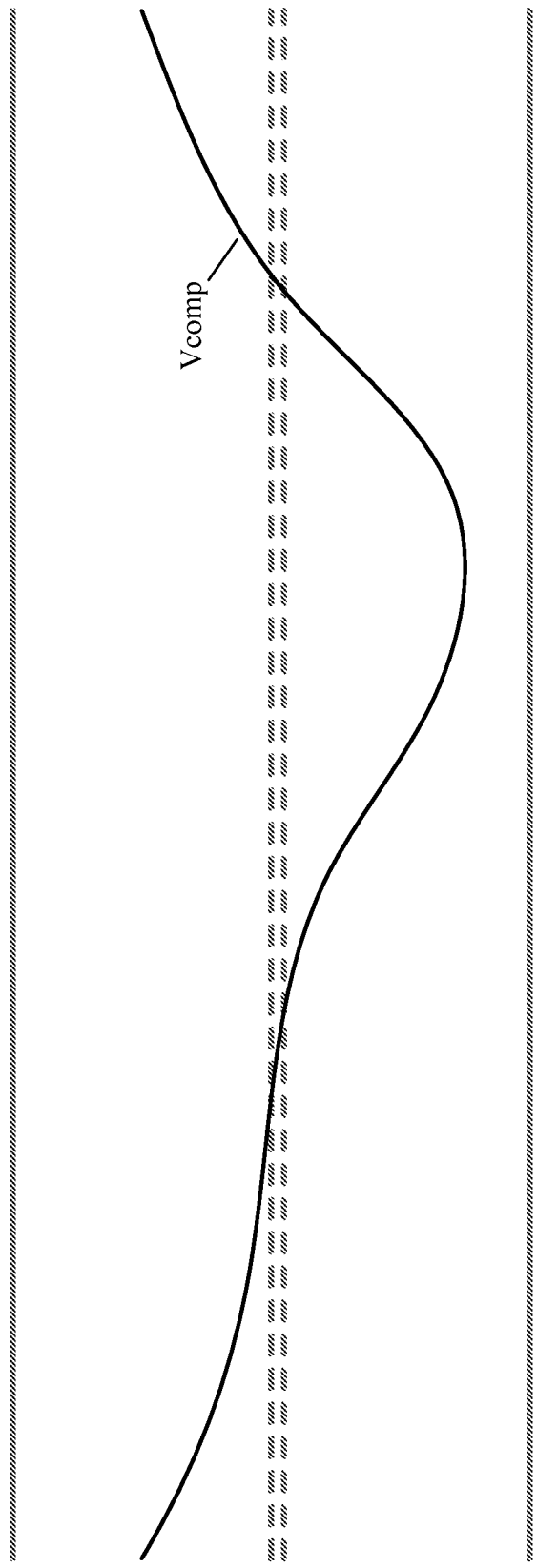
FIG. 12 illustrates buck-boost waveforms that are enabled by an auto bypass operation according to embodiments.

FIG. 12 illustrates an example of how Vcomp can be made to have a more desirable waveform as compared to the waveform in FIG. 11 by virtue of the auto-bypass operation of the present embodiments. In the "Auto-Bypass" state, no switching occurs and so there is no loss from current ripple in the inductor or switch driver losses.

In embodiments, state machine 802 can further implement an audio band suppression (ABS) function. For example, as shown in FIG. 8, the ABS function can be implemented by another timer 810, which can be driven by a low frequency clock (e.g., 30 kHz). State machine 802 can start the timer 810 whenever the controller transitions to either a buck or boost "Tri-state" state. If the state machine stays in either a buck or boost "Tri-state" state for two consecutive clock edges (as alerted by timer 810), the state machine 802 can transition from either 'Tri-State' state to the associated "Off" state. This induces a negative current flow in the inductor, and makes the hysteretic variable Vcomp drop in sympathy. When the hysteretic variable Vcomp crosses the appropriate lower threshold, a normal switching cycle ensues.

In embodiments, state machine 802 can still further implement a break before make (BBM) function. For example, as shown in FIG. 8, the BBM function can be implemented by another timer 812, which can be a simple countdown of a predetermined interval (e.g. 25 ns). State machine 802 can enter the buck or boost BBM state and start the timer 812 whenever the controller is in either a buck or boost "On" state, and the upper buck or boost window crossing signal is received. After the state machine stays in either a buck or boost BBM state for a predetermined time (as alerted by timer 812), the state machine 802 can transition from either BBM state to the associated "Off" state.

Figure 13:
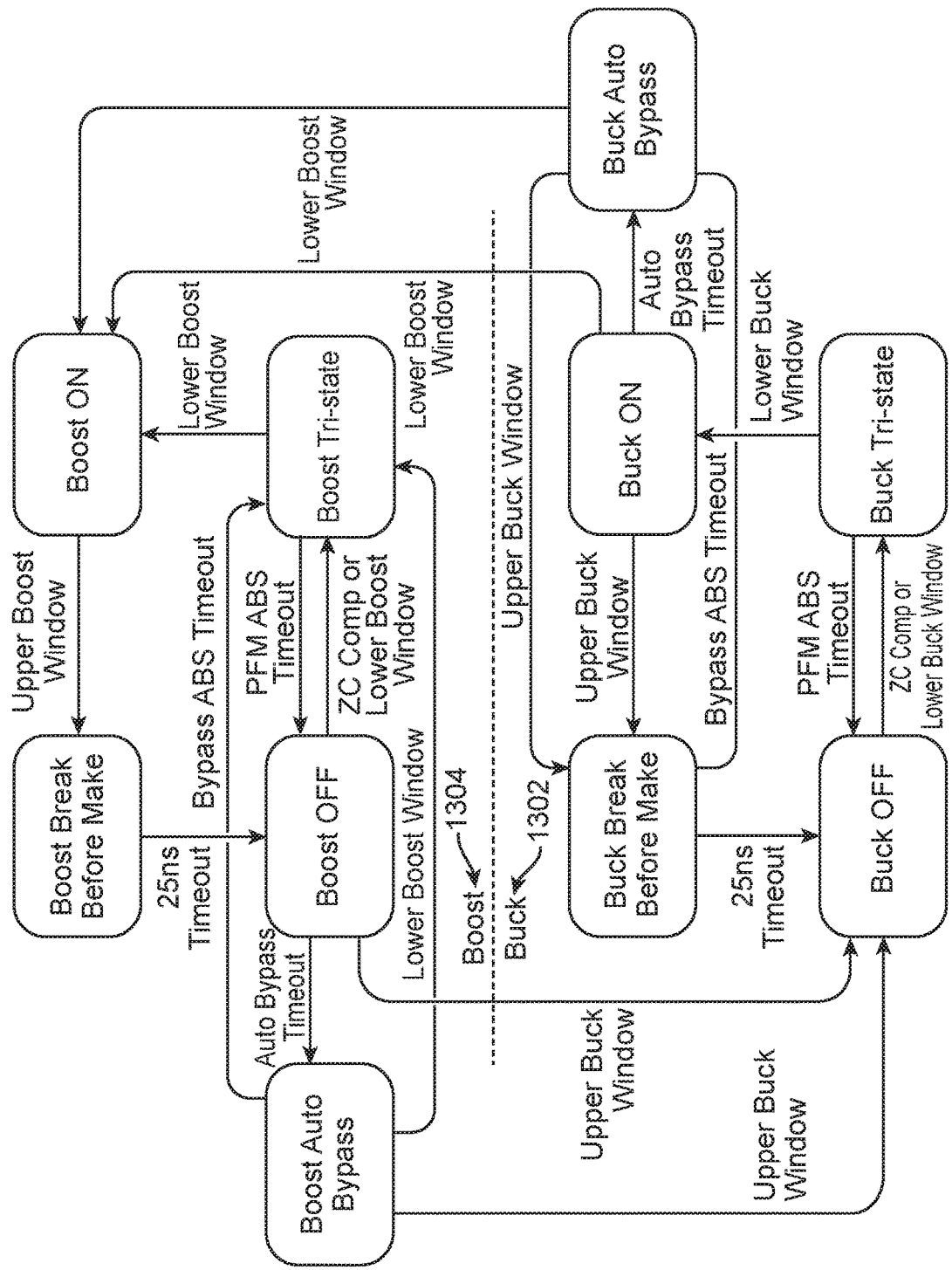
FIG. 13 is another example state diagram with PFM, auto-bypass and audio band suppression according to embodiments.

Adding the auto bypass, ABS (Audio Band Suppression) and BBM functions to the state machine 802 results in the example state diagram shown in FIG. 13. As can be seen, the state diagram includes similar states as shown in the example of FIG. 10. However, as discussed above, a "Bypass" state is added in both the buck mode 1302 and boost mode 1304, which is entered whenever the associated "Off" state exceeds the timeout detected by timer 808. Likewise, an additional check is made in both the buck and boost "Tristate" states to transition back to the associated "Off" state when the ABS timer 810 detects an ABS timeout. Further, an additional check is made in both the buck and boost "On" states whether an associated upper window crossing signal is received, upon which the associated "BBM" state is entered. State machine then transitions back to the associated "Off" state when the BBM timer 812 times out.

It should be noted that the state diagram shown in FIG. 13 is one simplified example of how an overall operation of the controller can be controlled. Those skilled in the art will appreciate that actual implementations may be more complex and include multiple different layered or hierarchical state implementations.

According to certain additional aspects, the present applicant recognizes that in order to avoid buck-boost cycles, the buck and boost regulation cycles must be able to regulate right up to the limiting case of bypass operation given by $$V\text{in} = V\text{out} + I\text{out} \cdot (R\text{dc} + R\text{sw})$$

where (Rdc+Rsw) is the total DC resistance of the inductor and switches 202-A and 202=D. Clocked converters are unable to do this, as they combine a fixed frequency and a minimum 'on' time (boost) or minimum 'off' time (buck). Moreover, the controller design above is not inherently low Iq.

Accordingly, in additional or alternative embodiments, a new topology to implement circuit 208 for generating the synthetic current ripple (e.g. the Ripple value input shown in FIG. 3) is used. Using only resistors, capacitors and analog switches it consumes no current in the PFM configuration. Because it has no active amplifying elements, it can respond immediately to the start of a switching cycle. During PWM operation, it consumes current from VIN and/or VOUT as the capacitors are charged and discharged through the resistors.

Figure 14:
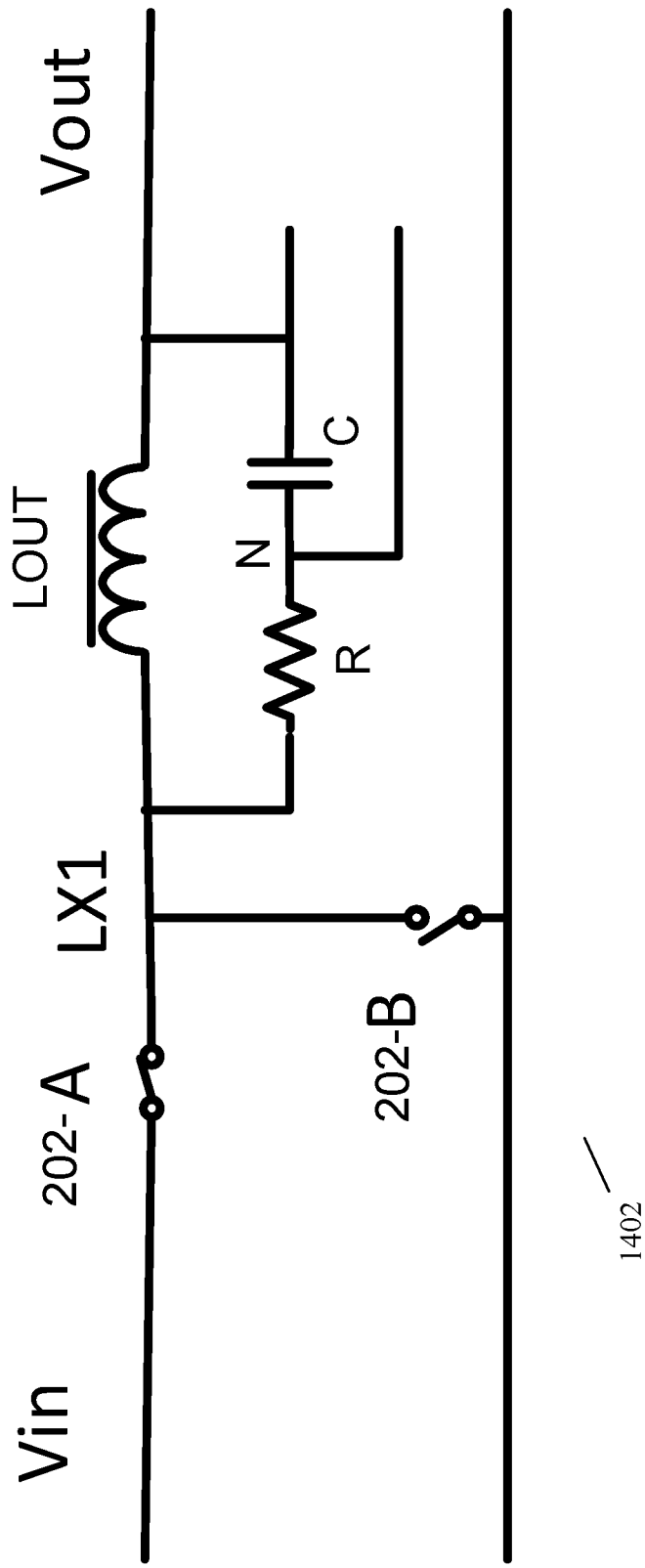
FIG. 14 illustrates an example inductor DCR based current sense technique.

FIG. 14 illustrates a conventional inductor DCR based current sense technique 1402, which can be adapted to provide a well-behaved ripple signal according to embodiments as described in more detail below. If the R-C time constant of the sense resistor R and capacitor C is equal to the L/R time constant of the inductor LOUT and its DC resistance, the ripple voltage (Ripple) is proportional to the inductor current. This is suitable for a buck or a boost converter, as either VIN or VOUT are suitable, near constant voltages. However, in a buck-boost controller, both ends of the inductor are switched (and not just the single set of switches 202-A and 202-B shown in FIG. 14), so the ripple voltage would undergo large, fast, common mode excursions.

Figure 15:
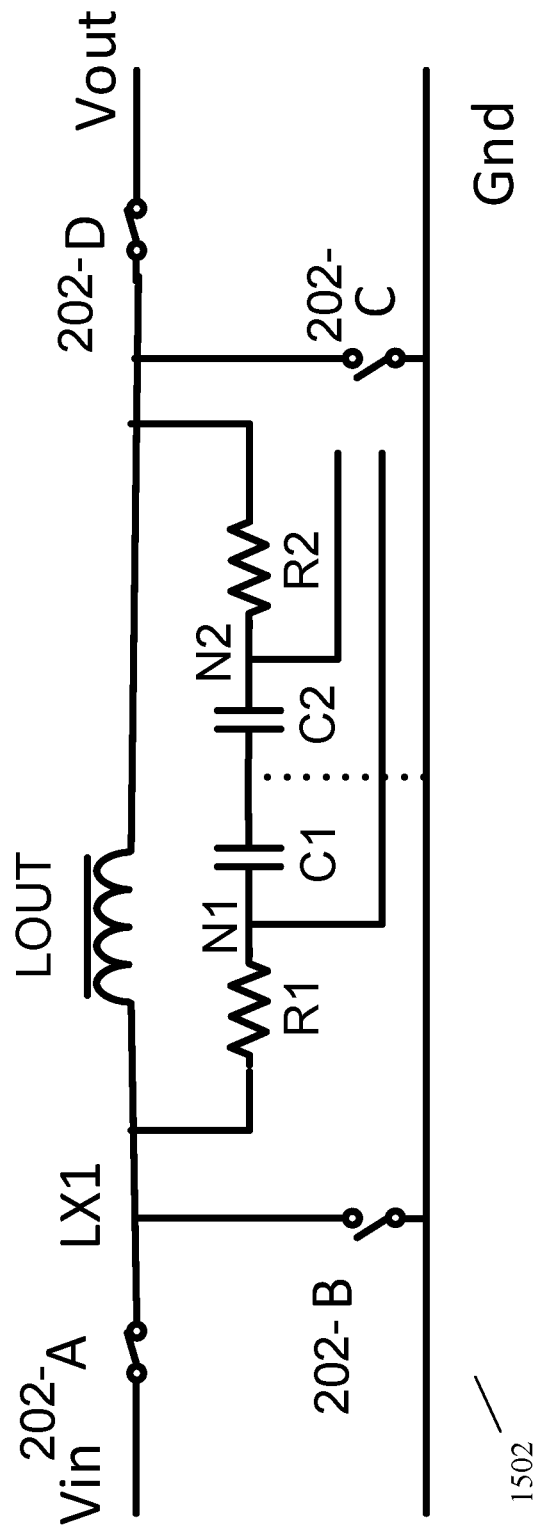
FIG. 15 illustrates a balanced implementation of the inductor DCR current sense shown in FIG. 14.

To solve this problem, as shown in FIG. 15, in the adapted DCR current sense circuit 1502, both the capacitor and resistor are replaced by two series components R1, C1, R2 and C2, then re-arranged. This does not change the sensed differential voltage. The next step is to ground the center point N of the capacitors. Again, this does not change the differential voltage, but it does add low pass filtering to the common mode signal.

Figure 16:
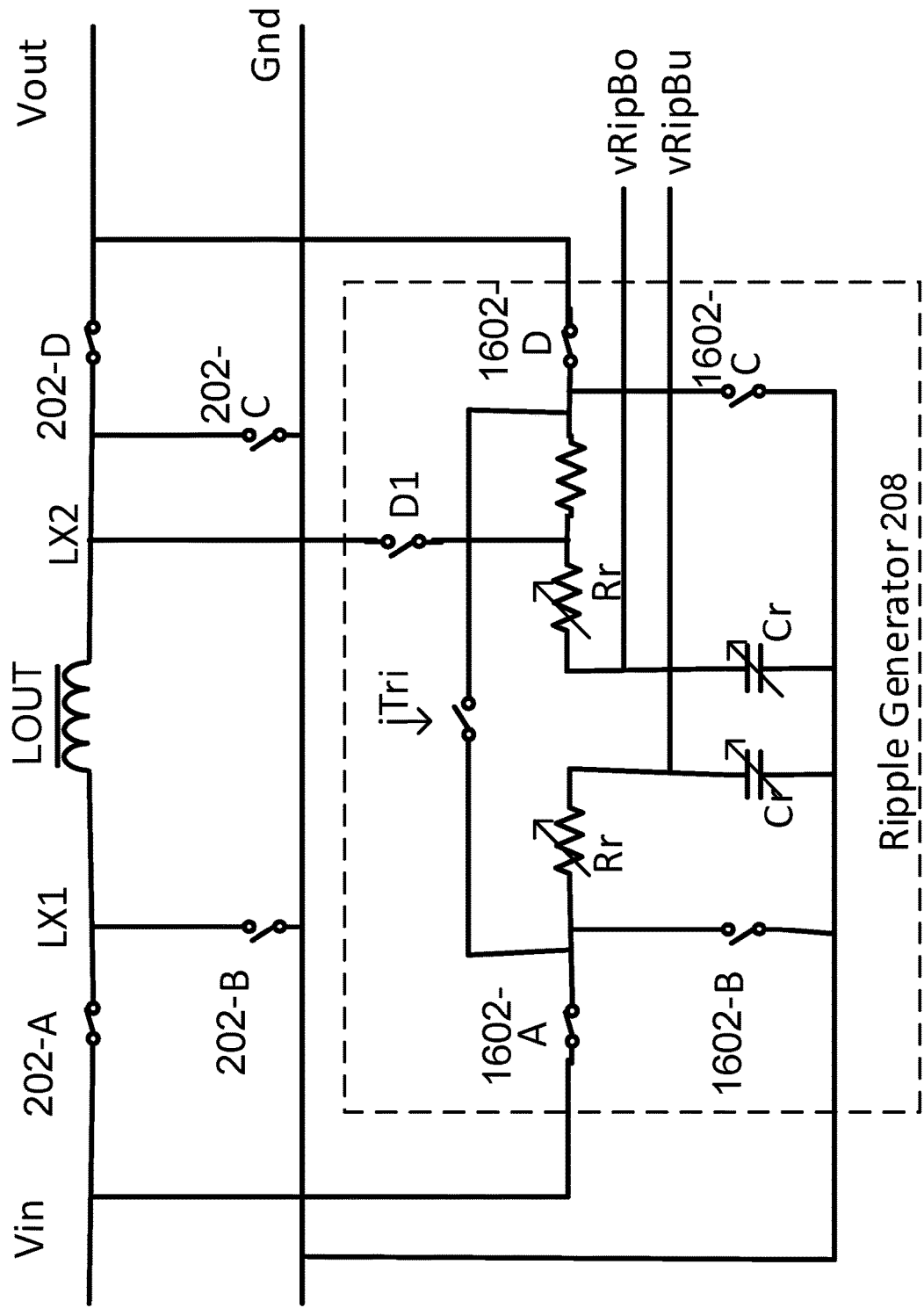
FIG. 16 is a schematic diagram illustrating an example Zero Iq Ripple generator according to embodiments.

The final step is to realize that the current sensing signal can be larger if the switch resistances are also spanned by the current sense. This leads to the final example implementation of circuit 208 shown in FIG. 16, where the total DC voltage drop available for current sensing is I*(2*Rdson+Rdc), where Rdson is the resistance of the power switches 202 (assumed equal) and Rdc is the inductor LOUT DC resistance. In embodiments, this approximately doubles the sensed voltage, as both the inductor DCR and the total switch resistance (2*Rdson) are similar.

More particularly, the example schematic diagram in FIG. 15 shows the ripple generator 208 and its connection to the power stages and inductor. Switches 202 in the power stage and corresponding switches 1602 in the ripple generator are driven by the same modulator output signals. The 'iTri' input is activated whenever either switches 202-A and 202-B are off, or switches 202-C and 202-D are off. This resets the ripple voltage and maintains it at zero The desired ripple output from 208 (i.e. Ripple provided to the circuit in FIG. 3) is the differential voltage across 'vRipBo' and 'vRipBu'.

There are some details to explain. The first detail is switch D1. The present applicant recognizes that it is preferable that the voltage into the R-C network closely follows the voltage across the inductor. Otherwise the modulator's estimate of the inductor current deviates too much from the actual current, and the modulator malfunctions. When the output voltage of the buck-boost is very low (e.g. during soft start) the PMOS power device of switch 202-C does not work, and the inductor current flows through the body diode. This creates a significant voltage between the LX2 node shown in FIG. 16 and the VOUT node, which will distort the current estimate. In these circumstances, switch D1 is turned on, so that the ripple generator makes a better estimate of the current ripple.

Figure 17:
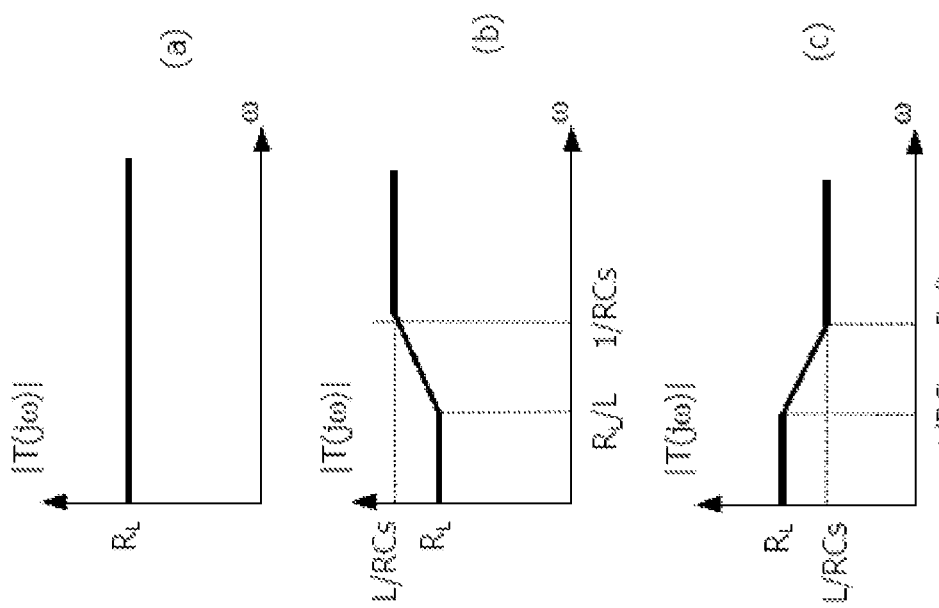
FIG. 17 illustrates pole-zero pairs inherent to inductor DCR current sense techniques.

Secondly, it is well known that this current sensing method has a pole-zero pair in its frequency response, as shown in FIG. 17. For a preferred design, the pole (1/RCs) should be at a slightly greater frequency than the zero (L/Rs), which is case (b) in FIG. 17.

Additional or alternative embodiments of the analog part 210 shown in FIG. 3 can include a nanopower differential combined error amplifier and ripple summer, as will now be described. Some conventional DC-DC controllers implement arithmetic operations on the ripple voltage (Ripple), amplified error (Verr) and window voltages (Vw1 and Vw2) in the single ended voltage domain to generate the window comparator input voltages (Vc1 & Vc2). Bounds on the ripple voltage are enforced by active clamp circuits acting on Ripple and Verr. In addition, the reference voltage Vref has to be generated and maintained.

Mathematically, $$Vc1 = Verr + Vw1 - \text{Ripple and so on}$$

The 'top-down' reasoning is to note that the output voltage error of a DC-DC converter appears as a voltage difference between the voltage reference and the feedback divider output. (Vref−Vfb). Also the passive ripple generator's output is also a differential voltage (vRipBo−vRipBu). The comparator inputs (Vc1, Vc2 etc) are also differential. A differential circuit implementation is likely to give the highest performance for a given power budget—as seen in contemporary ADC and baseband signal chain designs.

The bottom-up reasoning starts with the design of a low power comparator that could be used without an error amplifier to implement the PFM mode of a DC-DC converter. In some existing designs, such a comparator comprises three differential gain stages and a differential to single ended output stage with high output signal swing. The input stage is a resistor loaded differential pair. Among other things the present applicant recognizes that the ripple summation and window generation functions can be 'stacked' into the comparator stages so they do not require any additional supply current to generate the same total gain. Likewise, the clamp functions can also be included as implicit signal limits.

Figure 18:
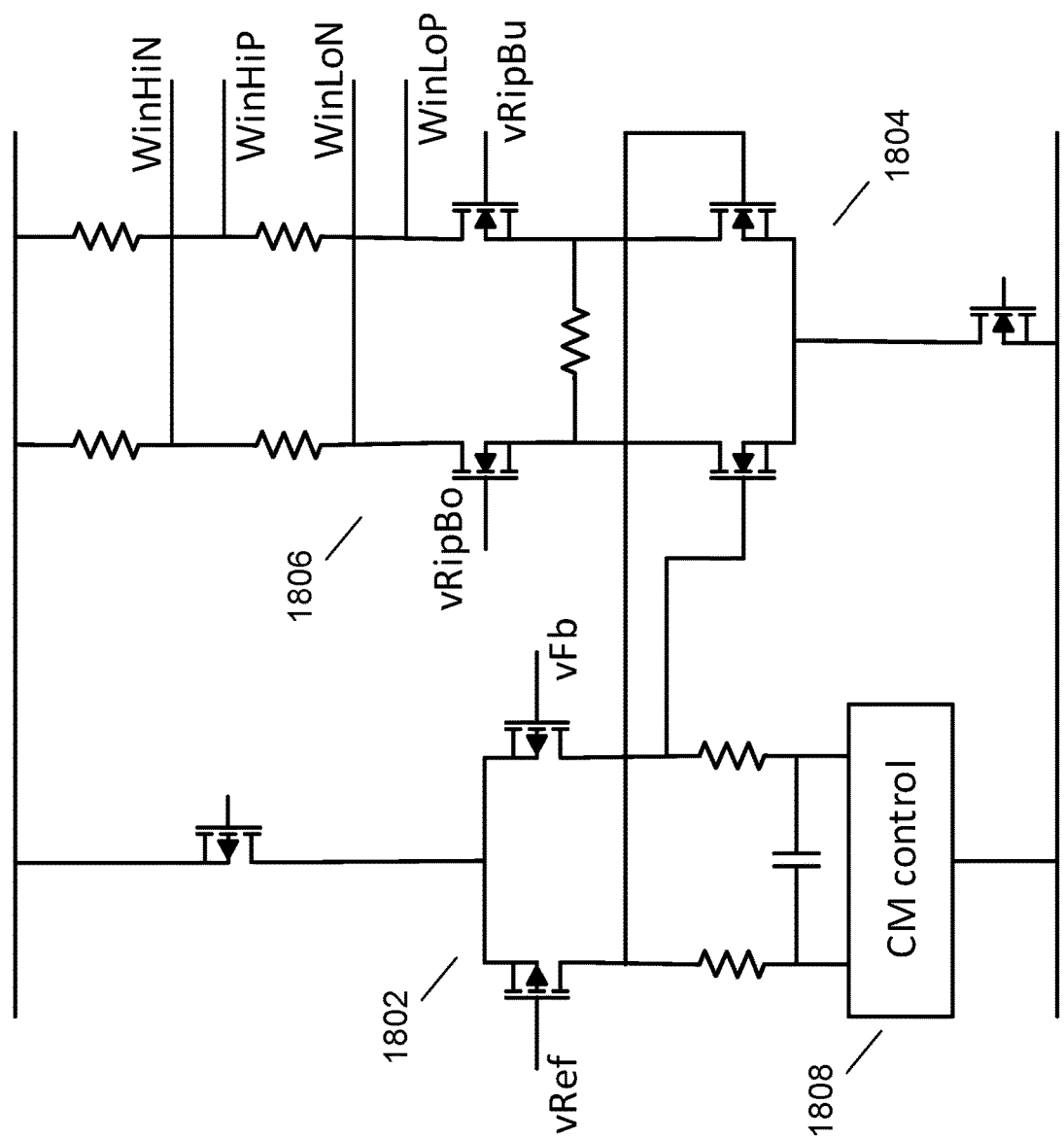
FIG. 18 is a schematic diagram illustrating an example combined error amplifier, ripple summer and window generator according to embodiments.

Based on these recognitions, the simplified schematic of the error amplifier 1802 in FIG. 18 shows that it is basically two cascaded resistor loaded differential pair amplifiers. An integrator 1804 is stacked under the load of the first stage, and the ripple summer 1806 is stacked above the second stage. The tapped load resistor of the second stage gives positive and negative offset voltages that set the window thresholds. The windows are formed as follows:

(WinLoP−WinHiN) forms the lower Boost threshold
(WinHiP−WinLoN) forms the upper Buck threshold
(WinLoP−WinLoN) forms the middle threshold There are four clamping levels to consider. The first is the maximum integrator output signal. This is defined by a voltage clamp built into the common mode control 1808 of the first stage. The second is the maximum error amplifier output (e.g., equivalent to Vcomp). This is defined by the maximum current output of the NMOS differential pair at the input of the second stage, which is ±Itail2. The third is the maximum effective input amplitude of the ripple summer, which is Itail/2*Rsum. The fourth is the maximum output of the summed ripple. Seen as a current at the output of the ripple summing differential pair this is also ±Itail2, irrespective of the voltage error magnitude.

This topology guarantees two properties: (1) The ripple input component can always exceed the clamped error voltage; and (2) The summed output can always exceed the window voltage.

These two properties ensure that the ripple input (current signal) can always make the output of the converter switch—in other words, they ensure that the converter always operates as a current mode hysteretic converter. This is important in boost mode operation. Without this condition, the ripple input could saturate before the voltage error input, causing the controller to become a voltage mode hysteretic controller, and not switch at all. Voltage mode hysteretic operation is allowable for a buck converter, but not a boost converter.

Another clamp circuit is used in some controllers to define the ripple voltage between current pulses in PFM, requiring current in both the clamp circuit and the Gm amplifiers. The 'Tri-state' switch in the ripple generator ensures that its output voltage is zero between PFM pulses but consumes no power.

Figure 19:
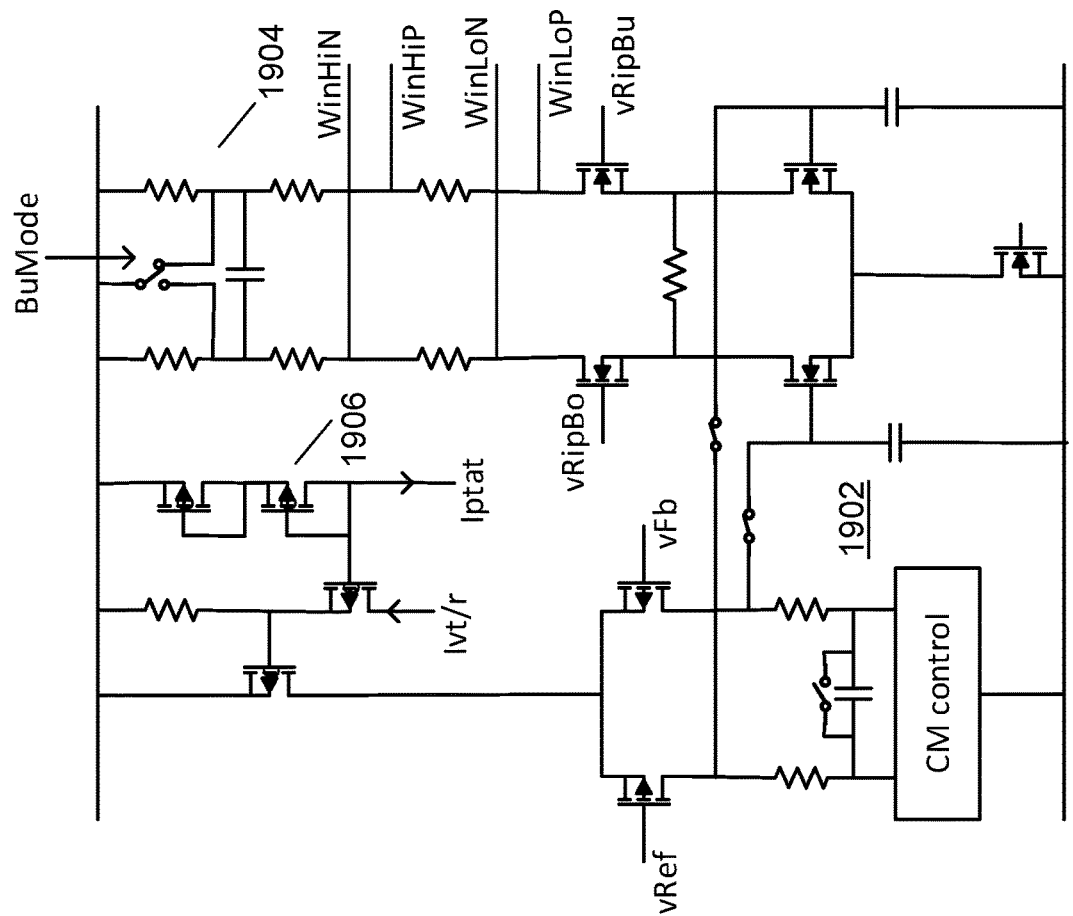
FIG. 19 is a schematic diagram illustrating another example combined error amplifier, ripple summer and window generator with all features according to embodiments.

In the alternative combined circuit shown in FIG. 19, two more functions are inserted into this amplifier, again without consuming power. The first is a sample and hold function 1902 between the first and second stages. This improves peak current control in boost operation, The next is a low pass filtered offset voltage that is summed with all three comparator outputs. This compensates for the difference in the mean of the hysteretic variable between buck and boost operation.

The window voltages are set by voltage drops over the second stage load resistors, so the second stage is fed with a substantially constant bias current. As the bias currents for this amplifier are in the 100 to 200 nA range, the MOS differential pairs are in deep subthreshold operation. As both differential pairs have a 1/ptat gain, to keep the gain from the error input to the output constant the first stage has a PTAT2 temperature dependence. This is generated from a PTAT bias by the translinear power of two circuit 1906.

The circuit 1904 formed by a switch driven by the Buck mode (BuMode) signal, and the associated R and C, form the low pass filtered offset voltage, which inherently tracks the window voltages.

Figure 20:
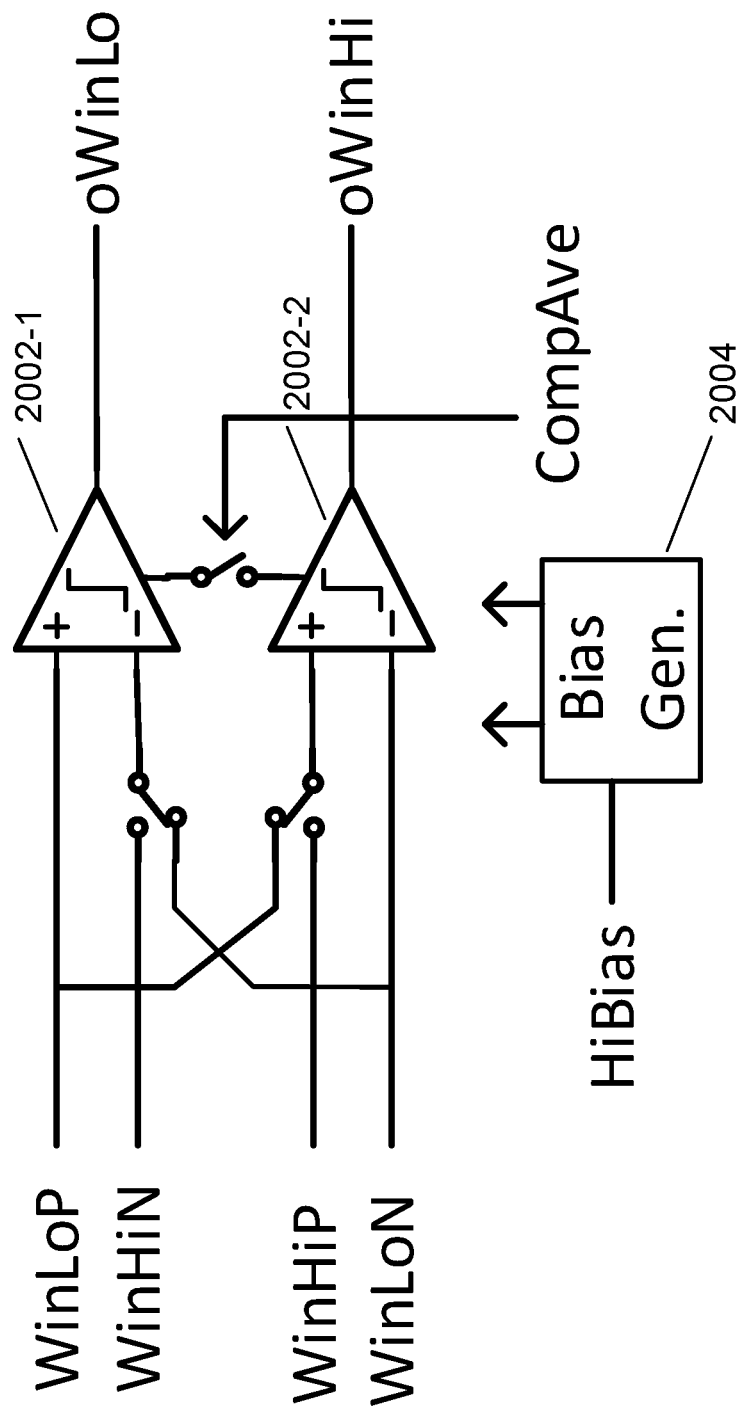
FIG. 20 is a schematic diagram illustrating example multiplexed comparators with threshold averaging according to embodiments.

Additional or alternative embodiments include multiplexed comparators with offset averaging. A particular arrangement of two comparators 2002 is used in this design, as shown in FIG. 20. It is noted that not all window comparators are 'active' at any one time. The state machine 802 may be waiting for either the upper buck or lower boost window crossing, or the middle window crossing.

So only two comparators are implemented in the example modulator shown in FIG. 20. These are multiplexed to create the three windows. In addition, to reduce the effect of offset errors, when sensing the middle window, both comparators 2002 are used. Not only are their inputs shorted together, but also the intermediate gain nodes. This averages the DC offset of the two comparators, ensuring that the middle window is half way between the upper and lower windows. This decreases the likelihood of the modulator 'bouncing' between buck and boost modes, which creates inefficient buck-boost cycles.

The bias generator is controlled by the state machine 802 to give two bias levels. The lower, 50 nA level is used during PFM and auto-bypass states. The higher 5 uA bias is used during PWM to reduce the propagation delay time of the comparators.

Several example advantages of the present embodiments are noted as follows. The fully hysteretic buck-boost controller of the embodiments provides full control of a buck-boost controller with the minimum of added circuitry over and above previous hysteretic controllers. For example, some existing buck-boost charger controllers add a second ripple generator, a third comparator and an input/output voltage window comparator. The hysteretic buck-boost controller of the embodiments transitions between buck, boost, auto-bypass, and PFM modes on a cycle by cycle basis, maintaining excellent transient response across mode changes. In PFM operation, ringing of the inductor current is damped to reduce EMI. The Zero Iq synthetic ripple generator provides an inductor current estimate while taking no current between pulses in PFM operation. The low Iq error amplifier and ripple summer allows the core of the hysteretic converter to remain powered up within the nanopower current budget. The comparator switching and averaging scheme allows the use of low current, fast comparators with large input referred DC offsets Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A buck-boost controller, comprising:
   a state machine that implements a state diagram for controlling transitions between a buck mode and a boost mode of operation of the buck-boost controller based on window crossing signals from a window comparator, wherein the state diagram comprises a buck on state, a buck off state, a boost on state and a boost off state;
   a multiplexer for selectively sending control signals to switching transistors of the buck-boost controller based on an output of the state machine; and
   an auto-bypass timer and wherein the state diagram further includes a buck bypass state and a boost bypass state, and wherein the state machine is configured to transition the buck-boost controller between the buck mode and the boost mode of operation when the state machine is in either the buck bypass state or the boost bypass state and based on an output of the auto-bypass timer.

2. A buck-boost controller comprising:
   a state machine that implements a state diagram for controlling transitions between a buck mode and a boost mode of operation of the buck-boost controller based on window crossing signals from a window comparator;
   a multiplexer for selectively sending control signals to switching transistors of the buck-boost controller based on an output of the state machine,
   wherein the state diagram comprises a buck on state, a buck off state, a boost on state and a boost off state, and
   wherein the state machine further receives a zero-crossing signal from the switching transistors, the state diagram further including a buck tristate state and a boost tristate state; and
   an audio band suppression (ABS) timer, and wherein the state machine is further configured to transition out of either the buck tristate state or the boost tristate state based on an output of the ABS timer.

3. A buck-boost controller, comprising:
a state machine that implements a state diagram for controlling transitions between a buck mode and a boost mode of operation of the buck-boost controller based on window crossing signals from a window comparator;
a multiplexer for selectively sending control signals to switching transistors of the buck-boost controller based on an output of the state machine,
wherein the state diagram comprises a buck on state, a buck off state, a boost on state and a boost off state, and
wherein the state machine further receives a zero-crossing signal from the switching transistors, the state diagram further including a buck tristate state and a boost tristate state, and
wherein the window crossing signals are generated based on a comparison of a compensation signal with upper and lower window voltages, and wherein the window crossing signals include an upper window crossing signal that indicates when the compensation signal exceeds the upper window voltage, and wherein the window crossing signals further include a lower window crossing signal that indicates when the compensation signal drops below the lower window voltage, and
wherein the compensation signal is based on a ripple signal representing a current output by the buck-boost controller.

4. The buck-boost controller of claim 3, wherein the upper and lower window voltages are generated based on respective reference voltages, and wherein the state machine is further configured to generate signals for controlling the respective reference voltages based on the window crossing signals.

5. The buck-boost controller of claim 3, wherein the window crossing signals include an upper window crossing signal that indicates when the compensation signal exceeds the upper window crossing signal that indicates when the compensation signal eceeds the upper window voltage, and wherein the window crossing signals further include a lower window crossing signal that indicates when the compensation signal drops below the lower window voltage.

6. The buck-boost controller of claim 5, wherein the state machine is configured to cause the buck-boost controller to transition from the buck mode of operation to the boost mode of operation in response to the lower window crossing signal.

7. The buck-boost controller of claim 5, wherein the stte machine is configured to cause the buck-boost controller to transition form the boost mode of operation to the buck mode of operation in response to the upper window crossing signal.

8. The buck-boost ontroller of claim 5, wherein the state machine is configured to cause the switching transistors of the buck-boost controller to increase an output voltage of the buck-boost controller in response to the lower window crossing signal.

9. The buck-boost controller of claim 5, wherein the state machine is configured to cause the switching transistors of the buck-boost controller to increase an output voltage of the buck-boost controller in decrease in response to the upper window crossing signal.

* * * * *